US011335469B2

(12) United States Patent
Carvajal et al.

(10) Patent No.: US 11,335,469 B2
(45) Date of Patent: May 17, 2022

(54) DRY CASK STORAGE SYSTEM HAVING DETECTION APPARATUS

(71) Applicant: Westinghouse Electric Company LLC, Cranberry Township, PA (US)

(72) Inventors: Jorge V. Carvajal, Irwin, PA (US);
Justin P. Schmidt, Lockport, IL (US);
Jeffrey L. Arndt, Pittsburgh, PA (US);
Paul M. Sirianni, Mars, PA (US);
Shawn C. Stafford, Scottdale, PA (US);
Kathryn E. Metzger, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 255 days.

(21) Appl. No.: 16/448,706

(22) Filed: Jun. 21, 2019

(65) Prior Publication Data

US 2020/0402680 A1   Dec. 24, 2020

(51) Int. Cl.
*G21C 17/06* (2006.01)
*G21C 17/112* (2006.01)
(Continued)

(52) U.S. Cl.
CPC ............ *G21C 17/112* (2013.01); *G08C 19/16* (2013.01); *G21C 13/087* (2013.01);
(Continued)

(58) Field of Classification Search
CPC ...... H04B 5/00; H04B 5/0043; H04B 5/0081; H04B 5/0012; H04B 1/04;
(Continued)

(56) References Cited

U.S. PATENT DOCUMENTS 4,939,477 A * 7/1990 Itoh .......................... H03F 3/72
330/252
6,252,923 B1 * 6/2001 Iacovino ................... G21F 5/06
376/272
(Continued)

FOREIGN PATENT DOCUMENTS

WO       2021055060 A2     3/2021

OTHER PUBLICATIONS

International Search Report and Written Opinion for International PCT Application No. PCT/US2020/038900, dated Mar. 24, 2021.

*Primary Examiner* — Lily C Garner
(74) *Attorney, Agent, or Firm* — K&L Gates LLP

(57) ABSTRACT

A dry cask storage system for spent nuclear fuel includes a detection apparatus having a resonant electrical circuit, with resonant electrical circuit being situated within an interior region of a metallic vessel wherein the SNF is situated. The detection apparatus includes a transmitter that generates an excitation pulse that causes the resonant circuit to resonate and to generate a response pulse. The resonant circuit includes an inductor that is formed with a core whose magnetic permeability varies with temperature such that the frequency of the resonant circuit varies as a function of temperature. The response pulse is then used to determine the temperature within the interior of the vessel where the SNF is situated. Pressure detection is also provided.

14 Claims, 17 Drawing Sheets

(51) Int. Cl.
*G08C 19/16* (2006.01)
*G21C 13/093* (2006.01)
*G21C 13/087* (2006.01)
*H04B 5/00* (2006.01)
*H04B 1/04* (2006.01)
*H04Q 9/00* (2006.01)
*G21C 17/10* (2006.01)

(52) U.S. Cl.
CPC ............ *G21C 13/093* (2013.01); *G21C 17/06* (2013.01); *G21C 17/10* (2013.01); *H04B 1/04* (2013.01); *H04B 5/00* (2013.01); *H04B 5/0012* (2013.01); *H04B 5/0043* (2013.01); *H04B 5/0081* (2013.01); *H04B 2001/0416* (2013.01); *H04Q 9/00* (2013.01)

(58) Field of Classification Search
CPC ............ H04B 2001/0416; H04B 17/11; H04B 17/21; H04Q 9/00; G08C 19/16; H03F 3/72
See application file for complete search history.

(56) References Cited

U.S. PATENT DOCUMENTS

| | | | | |
|---|---|---|---|---|
| 7,130,589 | B2 * | 10/2006 | Lee | H04L 27/364 455/67.11 |
| 8,767,903 | B2 * | 7/2014 | Seidel | G21C 17/10 376/245 |
| 9,807,475 | B2 † | 10/2017 | Subiry | |
| 10,672,527 | B2 * | 6/2020 | Petrosky | G21C 17/108 |
| 10,706,977 | B2 * | 7/2020 | James | G21C 17/108 |
| 10,811,153 | B2 * | 10/2020 | Carvajal | G21C 17/102 |
| 2009/0158614 | A1 | 6/2009 | Singh et al. | |
| 2016/0050469 | A1 * | 2/2016 | Subiry | H04Q 9/00 340/870.17 |
| 2018/0262222 | A1 * | 9/2018 | Uno | H04B 13/005 |
| 2019/0131024 | A1 * | 5/2019 | Pfeifer | G21F 5/00 |
| 2019/0180884 | A1 | 6/2019 | Carvajal et al. | |

\* cited by examiner
† cited by third party

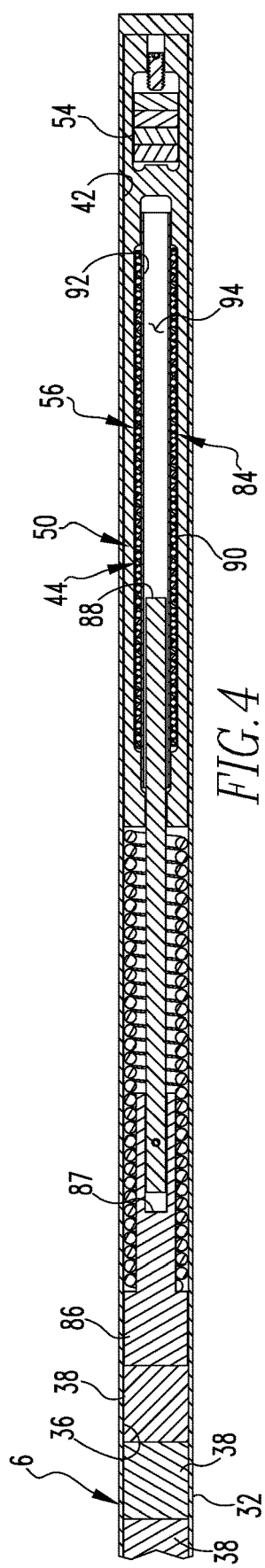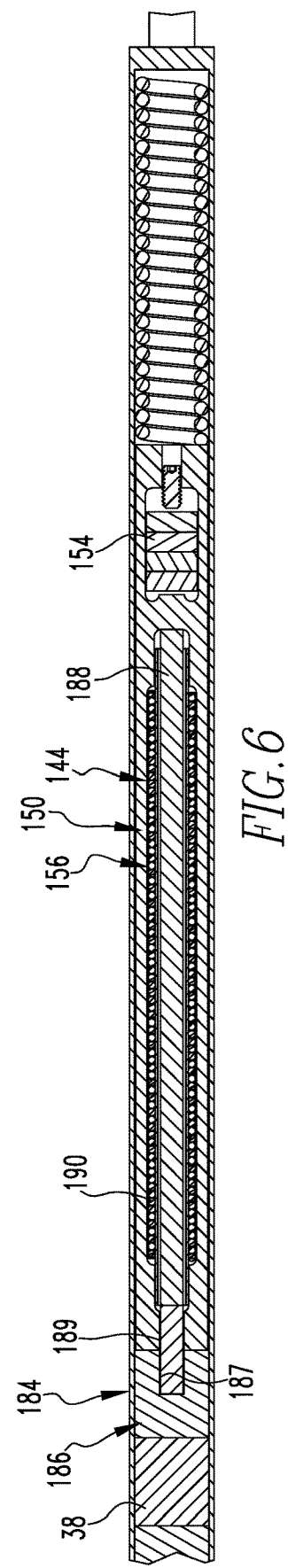

DRY CASK STORAGE SYSTEM HAVING DETECTION APPARATUS

BACKGROUND

1. Field

The disclosed and claimed concept relates generally to nuclear power equipment and, more particularly, to a Dry Cask Storage System (DCSS) for storing Spent Nuclear Fuel (SNF) and having a detection apparatus.

2. Related Art

In many state-of-the-art nuclear reactor systems, in-core sensors are employed for directly measuring the radioactivity within the core at a number of axial elevations. Thermocouple sensors are also located at various points around the core at an elevation where the coolant exits the core to provide a direct measure of coolant outlet temperature at various radial locations. These sensors are used to directly measure the radial and axial distribution of power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor is generally disposed within an instrument thimble within various fuel assemblies around the core, does not require an outside source of electrical power to produce the current, is commonly referred to as a self-powered detector, and is more fully described in U.S. Pat. No. 5,745,538, issued Apr. 28, 1998, and assigned to the Assignee of this invention.

Another type of sensor capable of measuring various parameters of the core, and which is typically disposed within the instrument thimbles in various fuel assemblies around the core, is described in U.S. patent application Ser. No. 15/417,504, filed Jan. 27, 2017. This type of sensor employs a transmitter device that includes a self-powered neutron detector structured to detect neutron flux, a capacitor electrically connected in parallel with the neutron detector, a gas discharge tube having an input end and an output end, and an antenna electrically connected to the output end in series with a resonant circuit. The input end of the gas discharge tube is electrically connected to the capacitor. The antenna is structured to emit a signal comprising a series of pulses representative of the intensity of the neutron flux monitored by the self-powered detector. Other core parameters can also be monitored by their effects on altering the values of the inductance and capacitance of the resonant circuit.

Still another in-core sensor, one which does not require signal leads to communicate its output out of the reactor, is disclosed in U.S. Pat. No. 4,943,683, which describes an anomaly diagnosis system for a nuclear reactor core having an anomaly detecting unit incorporated into a fuel assembly of the nuclear reactor core, and a transmitter-receiver provided outside the reactor vessel. The transmitter-receiver transmits a signal wirelessly to the anomaly detecting unit and receives an echo signal generated by the anomaly detecting unit wirelessly. When the anomaly detecting unit detects an anomaly in the nuclear reactor core, such as an anomalous temperature rise in the fuel assembly, the mode of the echo signal deviates from a reference signal. Then the transmitter-receiver detects the deviation of the echo signal from the reference signal and gives an anomaly detection signal to a plant protection system. The sensor actually monitors coolant temperature around the fuel assembly in which it is mounted.

Other difficulty has been encountered when Spent Nuclear Fuel (SNF) needs to be stored, such as after use in a nuclear reactor. It has been known to provide dry cask storage systems within which the SNF is stored. Such dry cask storage systems typically have included some type of a metallic vessel within which the SNF is situated, with the metallic vessel then being situated within a concrete overpack. Thermocouples have been situated between the vessel and the overpack in order to ascertain the temperature of the vessel, but such systems have experienced difficulty because a measurement of a temperature of a vessel from an exterior of the vessel does not necessarily provide an accurate description, for instance, a temperature within the interior of the vessel.

While each of the foregoing sensors directly monitors conditions related to a core of a nuclear reactor or a vessel of a dry cask storage system, such sensor have not been without limitation. Improvements thus would be desirable.

SUMMARY

None of the aforementioned sensors directly monitors conditions within a nuclear fuel rod in the core during reactor operation. Before advanced fuel cladding materials can be put into commercial use they have to be rigorously tested to receive regulatory approval. The existing methodology for testing advanced fuel cladding materials requires fuel rods to be tested over several fuel cycles and examined at the end of the irradiation test. This is a lengthy process that takes several years during which time fuel cladding data is not available. In the existing method, critical data is only obtained during the post irradiation examination activities. What is desired is an in-pile sensor that can be placed within a fuel rod, endure the hazardous conditions over several fuel cycles, and does not require penetrations into the cladding of the fuel rod.

This invention achieves the foregoing objective by providing a nuclear fuel rod real-time passive integral detection apparatus with a remote inductive or magnetic interrogator (also known as pulse induction). The detection apparatus includes a resonant electrical circuit configured to be supported within an interior of a nuclear fuel rod and structured to generate a generally sinusoidal response pulse in response to an incoming excitation pulse and transmit the response pulse in the form of a magnetic wave that travels through a cladding of the nuclear fuel rod to another location within a reactor in which the nuclear fuel rod is housed, wherein a characteristic of the generated pulse is indicative of a condition of the fuel rod. The detection apparatus also includes a transmitter structured to be positioned outside the cladding, in the reactor, in the vicinity of the fuel rod and configured to generate the excitation pulse and transmit the excitation pulse through the cladding to the resonant electrical circuit, and a receiver structured to be supported within the reactor outside of the cladding, in the vicinity of the nuclear fuel rod, and configured to receive the response pulse and, in response to the response pulse, communicates a signal to an electronic processing apparatus outside of the reactor.

Preferably, the resonant circuit is supported within a plenum of the nuclear fuel rod. In one such embodiment the characteristic of the response pulse is indicative of the center-line fuel pellet temperature. In another such embodiment the characteristic of the response pulse is indicative of fuel pellet elongation. In still another such embodiment the characteristic of the response pulse is indicative of fuel rod internal pressure. Furthermore, the characteristic of the response pulse may be configured to be simultaneously indicative of a plurality of conditions of the fuel rod.

An additional resonant electrical circuit can also be located in a bottom portion of the fuel rod in order to provide measurements at two different axial locations. Preferably, the resonant circuit comprises a plurality of circuit components whose properties such as capacitance and inductance are selected to create a response pulse having a unique frequency, which can be interpreted to identify the particular nuclear fuel rod from which the generated pulse emanated.

In addition, the detection apparatus may include a calibration circuit that is configured to be supported within the interior of the nuclear fuel rod and structured to generate a static calibration signal when interrogated by the excitation pulse from the transmitter, which can be received by the receiver and used to correct the response pulse received by the receiver for any signal change associated with component degradation or temperature drift.

A further advantage is obtained by providing a dry cask storage system (DCSS) that is structured to contain therein an amount of Spent Nuclear Fuel (SNF) and which includes a detection apparatus having a resonant electrical circuit, with resonant electrical circuit being situated within an interior region of a metallic vessel wherein the SNF is situated. The detection apparatus includes a transmitter that generates an excitation pulse and transmits the excitation pulse through a metallic wall of the vessel and into the interior region. The excitation pulse causes the resonant circuit to resonate and to generate a response pulse that is in response to the excitation pulse and to transmit the response pulse through the wall to a receiver. Advantageously, the resonant circuit includes an inductor that is formed with a core whose magnetic permeability varies in a well understood fashion with temperature, with the result that the frequency of the resonant circuit varies as a function of temperature within the interior of the vessel. The frequency of the response pulse is then used to determine the temperature within the interior of the vessel where the SNF is situated.

Accordingly, an aspect of the disclosed and claimed concept is to provide an improved dry cask storage system (DCSS) structured to contain therein an amount of spent nuclear fuel (SNF). The DCSS can be generally stated as including a vessel having a wall that is formed of a metallic material and that is formed to have a first interior region, the first interior region being structured to receive therein the SNF, a overpack that is formed of a cementitious material and that is formed to have a second interior region, the vessel being received in the second interior region, a detection apparatus that is cooperable with an electronic processing apparatus that is situated outside of the DCSS, the detection apparatus can be generally stated as including a transmitter, an electrical circuit apparatus, and a receiver, the transmitter being positioned inside the second interior region and outside the vessel and being structured to generate an excitation pulse and to transmit the excitation pulse through the wall and into the first interior region, the electrical circuit apparatus having a resonant electrical circuit that is situated within the first interior region and that is structured to generate a response pulse in response to the excitation pulse and to transmit the response pulse in the form of a magnetic field signal that is structured to travel from the first interior region and through the wall, the resonant electrical circuit can be generally stated as including a plurality of circuit components, at least one circuit component of the plurality of circuit components having a property which is structured to vary in response to a condition within the first interior region and which, responsive to a change in the condition, is structured to cause the property and the response pulse to vary with the change in the condition and to be indicative of the condition, and the receiver being situated inside the second interior region and outside the vessel, the receiver being structured to receive the response pulse and to communicate to the electronic processing apparatus an output responsive to the response pulse.

BRIEF DESCRIPTION OF THE DRAWINGS

A further understanding of the invention can be gained from the following Description when read in conjunction with the accompanying drawings in which:

FIG. 4 is a partially cut away depiction of a fuel rod within which an electrical circuit apparatus of the detection apparatus of FIG. 1 is situated;

FIG. 6 is a depiction of another fuel rod, partially cut away, and including an electrical circuit apparatus in accordance with a second embodiment of the disclosed and claimed concept;

Similar numerals refer to similar parts throughout the specification.

DESCRIPTION

Figure 1:
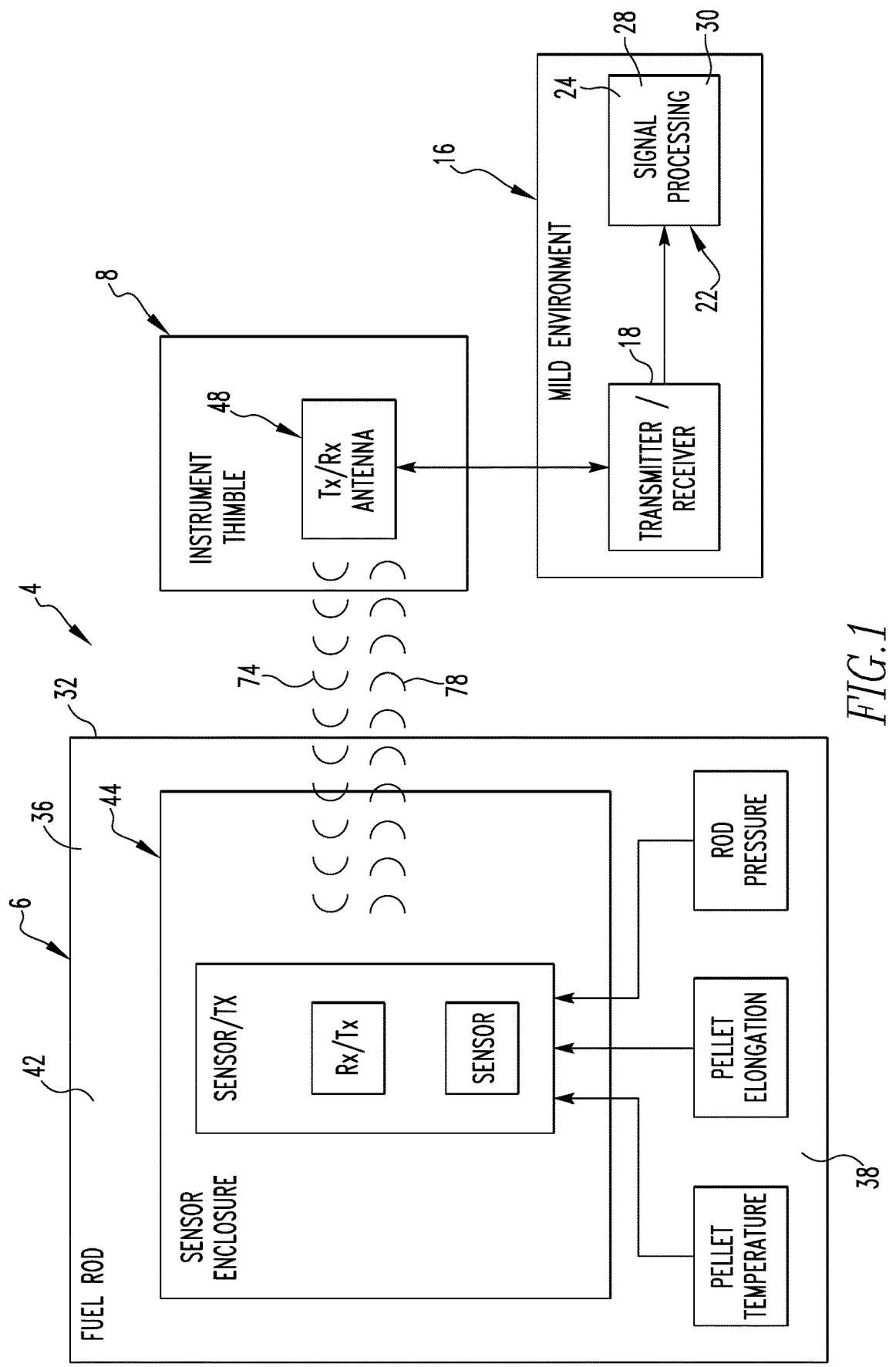
FIG. 1 is a functional schematic of an improved detection apparatus in accordance with a first embodiment of the disclosed and claimed concept that is usable with a fuel rod and an instrument thimble of a nuclear installation.
Figure 2:
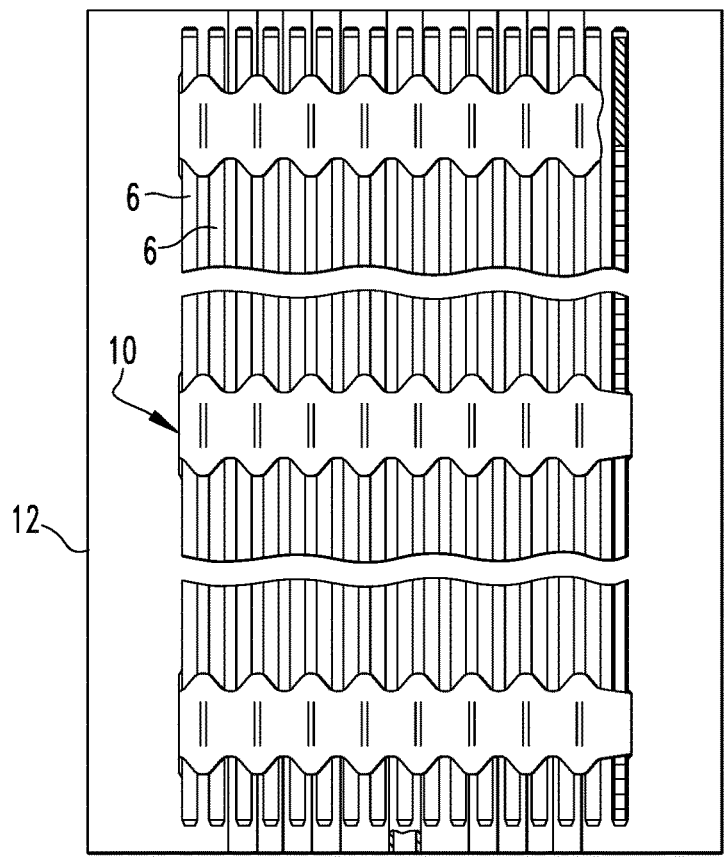
FIG. 2 is a schematic depiction of a nuclear installation having a nuclear reactor that includes a fuel assembly that, in turn, includes the fuel rod and instrument thimble with which the detection apparatus of FIG. 1 is usable.

An improved detection apparatus 4 in accordance with the disclosed and claimed concept is depicted generally in FIG. 1. The detection apparatus 4 is usable with a fuel rod 6 and an instrument thimble 8, such as are included in a fuel assembly 10 (FIG. 2) of a nuclear reactor that is depicted schematically in FIG. 2 at the numeral 12, which signifies a containment of the nuclear reactor 12.

The detection apparatus 4 is situated within the containment of the nuclear reactor 12, and the detection apparatus 4 is cooperable with an electronic processing apparatus 16 that is situated external to the containment of the nuclear reactor 12. The detection apparatus 4 is thus intended to be situated within the harsh environment situated within the interior of the containment of the nuclear reactor 12 whereas the electronic processing apparatus 16 is situated in a mild environment external to the containment of the nuclear reactor 12.

As can be understood from FIG. 1, the electronic processing apparatus 16 can be seen as including a transceiver 18 and a signal processor 22. The transceiver 18 is connected with a wired connection with an interrogation apparatus 48 that is situated in the instrument thimble 8. The signal processor 22 includes a processor and storage 24, with the storage 24 having stored therein a number of routines 28, and the storage 24 further having stored therein a number of data tables 30. The routines 28 are executable on the processor to cause the detection apparatus 4 to perform various operations, including receiving signals from the transceiver 18 and accessing the data tables 30 in order to retrieve values that correspond with aspect of the signals from the transceiver 18 that are representative of conditions inside the fuel rod 6.

As can further be understood from FIG. 1, the fuel rod 6 can be said to include a cladding 32 and to have an interior region 36 situated within the cladding 32 and a number of fuel pellets 38 situated within the interior region 36. As employed herein, the expression "a number of" and variations thereof shall refer broadly to any non-zero quantity, including a quantity of one. The fuel rod has a plenum 42 in generally a vertically upper end of the fuel rod 6.

The detection apparatus 4 can be said to include an electrical circuit apparatus 44 that is supported within the plenum 42 of the fuel rod 6 within the interior region 36 thereof. The detection apparatus 4 further includes the interrogation apparatus 48, which can be said to be situated within an interior of the instrument thimble 8. As is schematically depicted in FIG. 1, the electrical circuit apparatus 44 is situated within the interior region 36 and communicates with the interrogation apparatus 48 without any breaches or other openings being formed in the cladding 32, thereby advantageously keeping the cladding 32 intact and advantageously keeping the fuel pellets 38 fully contained within the interior region 36.

As can be further understood from FIG. 1, and as will be set forth in greater detail below, the electrical circuit apparatus 44 and the interrogation apparatus 48 communicate wirelessly with one another. Conditions within the interior region 36 of the fuel rod 6 can be said to include a temperature of the fuel pellets 38, an extent of physical elongation of the fuel pellets 38, and the ambient pressure within the interior of the fuel rod 6, by way of example. These three conditions are directly detectable by the electrical circuit apparatus 44 and are communicated through the interrogation apparatus 48 to the electronic processing apparatus 16. As will likewise be set forth in greater detail below, various embodiments are disclosed wherein the temperature and elongation of the fuel pellets 38 are detected in various ways, and wherein the ambient pressure within the interior region 36 of the fuel rod 6 is detected in various ways. It is understood that these properties are not intended to be limiting, and it is also understood that other properties potentially can be detectable without departing from the spirit of the instant disclosure.

Figure 3:
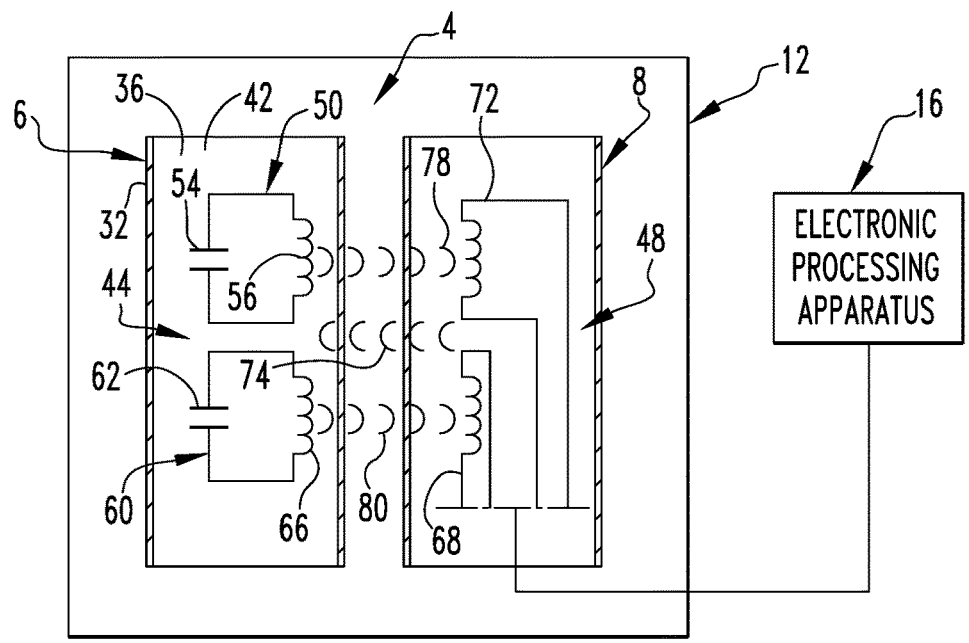
FIG. 3 is another schematic depiction of the detection apparatus of FIG. 1.

As can be understood from FIG. 3, the electrical circuit apparatus 44 can be said to include a resonant electrical circuit 50 that operates as a sensor and that includes a plurality of circuit components that include a capacitor 54 and an inductor 56. The circuit components have values or properties, such as the capacitance of the capacitor 54 and the inductance of the inductor 56, by way of example, which are selected to impart to the resonant electrical circuit 50 a unique nominal frequency which, when detected by the interrogation apparatus 48, is usable to identify the particular fuel rod 6 within which the electrical circuit apparatus 44 is situated.

In this regard, it is understood that a plurality of instances of the electrical circuit apparatus 44 can be situated in a plurality of corresponding fuel rod 6 of the fuel assembly 10. During operation of the detection apparatus 4, the interrogation apparatus 48 interrogates the electrical circuit apparatus 44 in order to receive a signal from the electrical circuit apparatus 44 that can be interpreted as being indicative of one or more of the properties or conditions within the interior region 36 of the fuel rod 6, such as temperature and/or elongation of the fuel pellets 38, ambient pressure within the interior region 36 of the fuel rod 6, etc., and by way of example. The fuel assembly 10 includes a large number of the fuel rods 6, and a subset of the fuel rods 6 of the fuel assembly 10 are envisioned to each have a corresponding electrical circuit apparatus 44 situated therein. When the interrogation apparatus 48 sends out its interrogation signal, the various electrical circuit apparatuses 44 will responsively output a signal that is transmitted through the cladding 32 or the corresponding fuel rod 6 and is received by the interrogation apparatus 48. The various signals from the various electrical circuit apparatuses 44 each has a unique nominal frequency that is selected by selecting the various properties of the capacitor 54 and the inductor 56, by way of example, of the electrical circuit apparatus 44 in order to provide such a signature frequency. The electric processing apparatus 16 is thus able to use the frequencies of the various detected signals to determine which signal corresponds with which fuel rod 6 of the fuel assembly 10.

As can further be understood from FIG. 3, the electrical circuit apparatus 44 additionally includes a resonant electrical circuit 60 that is usable as a calibration circuit. That is, the resonant electrical circuit 50 is usable as a sensor circuit that senses the property or condition within the interior region 36 of the fuel rod 6, and the resonant electrical circuit 60 is usable as a calibration circuit to compensate the signal from the resonant electrical circuit 50 for component degradation, temperature drift, and the like. In this regard, the resonant electrical circuit 60 includes a capacitor 62 and an inductor 66 that are selected to have the same material properties as the capacitor 54 and the inductor 56 of the resonant electrical circuit 50. However, and as will be set forth in greater detail below, the resonant electrical circuit 50 is exposed to the condition that is being measured within the interior region 36, such as the temperature and/or elongation of the fuel pellets 38, and/or the ambient pressure within the interior region 36, by way of example. The resonant electrical circuit 60, being usable as a calibration circuit, is generally not so exposed to the condition being measured. Such calibration is provided by employing a ratiometric analysis such as will be discussed in greater detail elsewhere herein.

As can further be understood from FIG. 3, the interrogation apparatus 48 can be said to include a transmitter 68 and a receiver 72. The transmitter 68 is configured to output an excitation pulse 74 which is in the form of a magnetic field signal that is capable of being transmitted through the cladding of the instrument thimble 8 within which the interrogation apparatus 48 is situated and is further capable of being transmitted through the cladding 32 of the fuel rod 6. The excitation pulse 74 is thus receivable by the inductor 56 and the inductor 66 of the resonant electrical circuits 50 and 60, respectively, to induce a resonant current in the resonant electrical circuits 50 and 60 in a known fashion. The induced currents in the resonant electrical circuits 50 and 60 result in the outputting of a response pulse 78 from the resonant electrical circuit 50 and a response pulse 80 from the resonant electrical circuit 60. The responses pulses 78 and 80 are in the form of magnetic field signals, which are not merely radio frequency signals, and which can be transmitted from the electrical circuit apparatus 44 through the cladding 32 and through the cladding of the instrument thimble 8 and thus be received on the receiver 72.

Figure 5A:
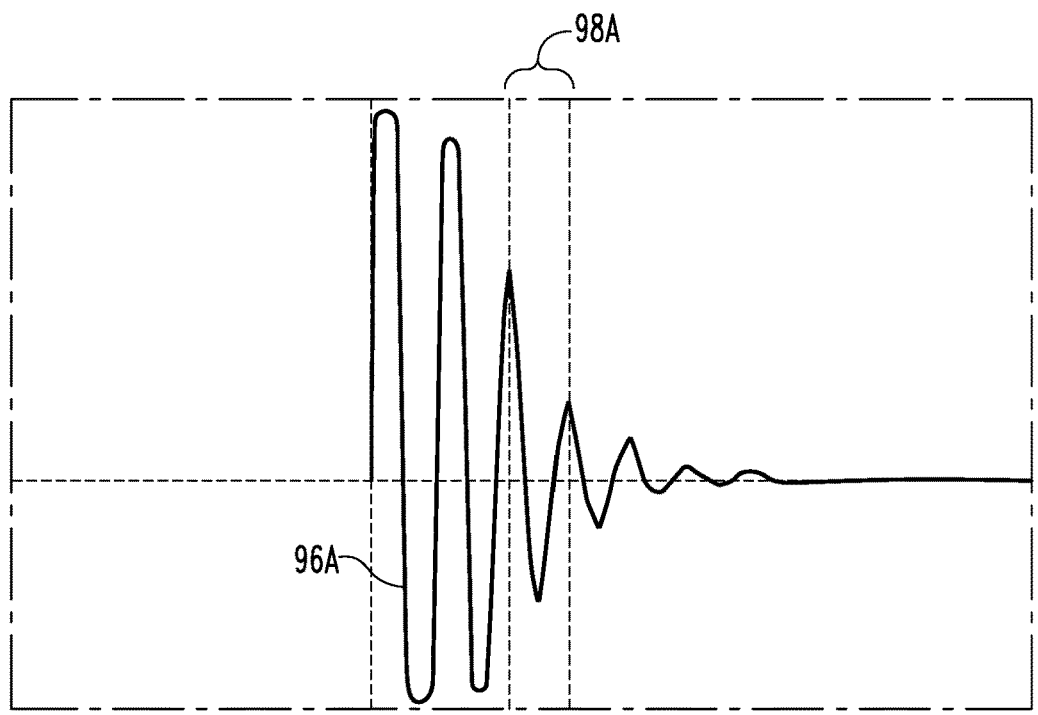
FIG. 5A is a depiction of a trace of an exemplary response signal that is output by the electrical circuit apparatus of FIG. 4.
Figure 5B:
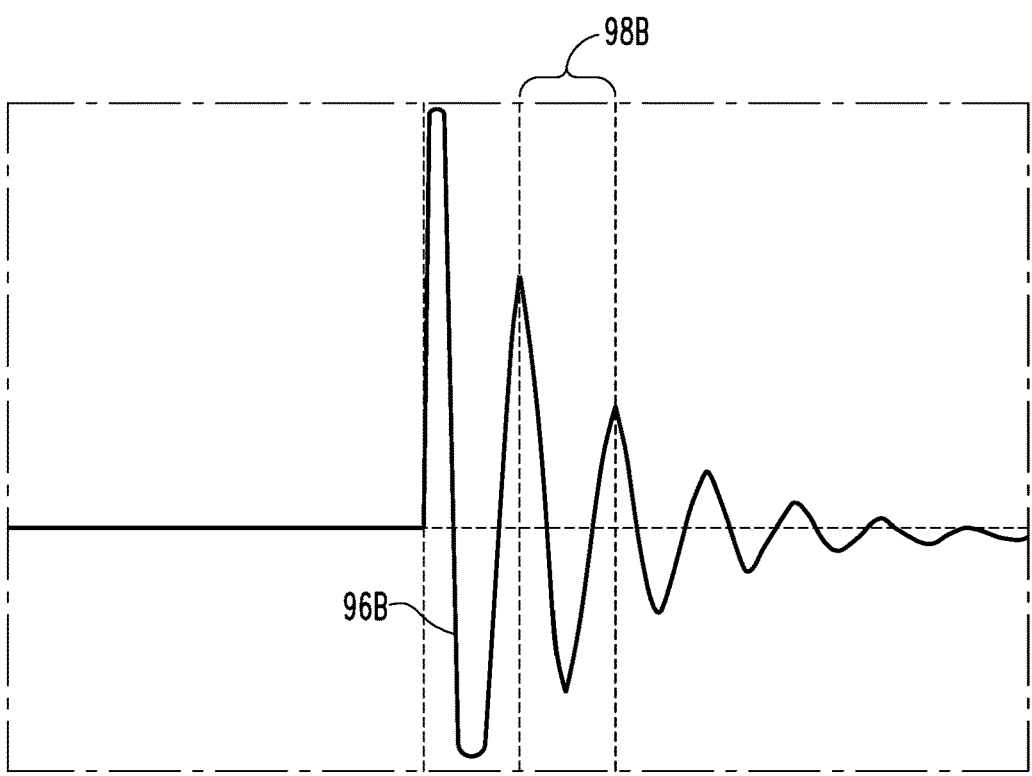
FIG. 5B is an exemplary alternative trace of an alternative response signal that is output by the electrical circuit apparatus of FIG. 4.

The excitation pulse 74 is of a generally sinusoidal configuration. The response pulses 78 and 80 are likewise sinusoidal pulses, but they are decaying sinusoidal signals, and it is noted that FIGS. 5A and 5B depict a pair of traces that are representative of two different response pulses 78. In this regard, the frequency of the response pulse 78 may correlate with one parameters within the fuel rod 6, such as temperature, the peak amplitude of the response pulse 78 may correspond with another parameter within the fuel rod 6, such as elongation of the fuel pellets 38, and a decay rate of the response pulse rate 78 may correlate with yet another parameter within the fuel rod 6, such as ambient pressure within the interior region 36. As such, the response pulse 78 may be correlated with a plurality of parameters or conditions within the interior region 36 of the fuel rod 6 within which the electrical circuit apparatus 44 is situated.

The aforementioned ratiometric analysis of the response pulses 78 and 80 typically involves taking a ratio of the response pulse 78 to the response pulse 80 or vice versa, in order to eliminate the effects of component degradation and temperature drift. For instance, the resonant electrical circuits 50 and 60 may degrade over time thus affecting the signal that is output therefrom. Likewise, the signals that are output from the resonant electrical circuits 50 and 60 can vary with temperature of the nuclear reactor 12. In order to compensate for these factors, it is assumed that the resonant electrical circuit 50 and the resonant electrical circuit 60 will degrade at substantially the same rate over time. Furthermore, the resonant electrical circuits 50 and 60 will be exposed to the same gross, i.e., overall, temperature within the interior of the nuclear reactor 12. By taking the ratio of the response pulses 78 and 80, such as the ratio of the frequencies, by way of example, and by using the ratio to look up in the data tables 30 a corresponding value for temperature, elongation, and/or pressure, the individual effects of component degradation and temperature drift in the resonant circuit 50 are eliminated. This is because the ratiometric signal is independent of component degradation and temperature drift since the resonant electrical circuits 50 and 60 are assumed to both experience the same component degradation and temperature drift.

As is best shown in FIG. 4, the electrical circuit apparatus 44 further includes a elongation transmission apparatus 84 that is situated within the interior region 36 of the fuel rod 6. The elongation transmission apparatus 84 includes a support 86 that is formed of a ceramic material in the depicted exemplary embodiment and which is abutted against the stack of fuel pellets 38. The support 86 has a receptacle 87 formed therein, and the elongation transmission apparatus 84 further includes an elongated element that is in the form of a ferritic rod 88 and that is received in the receptacle 87. The inductor 56 includes a coil 90 that is situated about and exterior surface of a tube 92 that is formed of a ceramic material. The tube 92 has an interior 94 within which an end of the ferritic rod 88 opposite the support 86 is receivable.

As the fuel pellets 38 increase in temperature, they thermally expand, thus causing the fuel pellets 38 to push the support 86 and thus the ferritic rod 88 in a rightward direction in FIG. 4, and thus to be received to a relatively greater extent within the interior 94, which alters the inductance of the inductor 56. Such an alteration of the inductance of the inductor 56 adjusts the frequency of the resonant electrical circuit 50, which is detectable when the excitation pulse 74 excites an electrical resonance in the resonant electrical circuit 50. The response pulse 78 from the resonant electrical circuit 50 thus has a frequency that is indicative of the extent of elongation of the fuel pellets 38. The response pulses 78 and 80 are received by the receiver 72, and the receiver 72 responsively sends a number of signals to the electronic processing apparatus 16. The electronic processing apparatus 16 uses the ratio of the response pulses 78 and 80, or vice versa, to retrieve from the data tables 30 an identity of the fuel rod 6 within which the electrical circuit apparatus 44 is situated, based upon the signature nominal frequency of the response pulses 78 and 80, and additionally retrieves from the data tables 30 a value that corresponds with the extent of elongation of the fuel pellets 38 as exemplified by the response pulse 78. These data can then be sent into a main data monitoring system of the nuclear reactor 12, by way of example, or elsewhere.

In this regard, it is noted that the calibration circuit represented by the resonant electrical circuit 60 is not strictly critical for the detection of the properties or conditions such as fuel elongation, center line fuel temperature, and ambient pressure, within the interior of the various fuel rods 6. As such, it is understood that the calibration circuit 60 is optional in nature and is usable in order to simplify the data gathering operation and to overcome limitations associated with component degradation and temperature drift, but the calibration circuit 60 is not considered to be necessary to the operation of the detection apparatus 4. As such, it is understood the various other types of electrical circuit apparatuses in the various other embodiments that are described elsewhere herein may or may not include a calibration circuit without departing from the spirit of the instant disclosure. In this regard, it is noted that the calibration circuit 60 is described only in terms of the electrical circuit apparatus 44, but it is understood that any of the other embodiments of the other electrical circuit apparatuses herein may incorporate such a calibration circuit.

As suggested above, the response pulse 78 is a decaying sine wave that has properties such as a peak amplitude, a frequency, and a rate of decay. FIG. 5A depicts a trace 96A of one such response pulse 78, and FIG. 5B depicts another trace 96B of another such response pulse 78. It can be understood from FIGS. 5A and 5B that the trace of FIG. 5A has a greater peak amplitude, a higher frequency (as indicated by the shorter period 98A compared with the period 98B in FIG. 5B), and further has a higher rate of decay than the trace 96B of FIG. 5B. As such, while any one of temperature, pressure, and elongation can be directly measured from the frequency of either of the traces 96A and 96B, it is understood that a plurality of such parameters can be simultaneously derived from each such trace 96A and 96B depending upon the configuration of the routines 28 and the data tables 30, by way of example.

It thus can be said that elongation of the fuel pellets 38 can affect the inductance value of the inductor 56 by virtue of the relative movement of the ferritic rod 88 with respect to the coil 90. This affects the frequency of the response pulse 78 that is output by the resonant electrical circuit 50, and which is therefore detectable by the electronic processing apparatus 16 through the use of the routines 28 and the data table 30.

FIG. 6 depicts an improved electrical circuit apparatus 144 in accordance with a second embodiment of the disclosed and claimed concept. The electrical circuit apparatus 144 includes a resonant electrical circuit 150 having a capacitor 154 and an inductor 156, and is thus similar in that fashion to the electrical circuit apparatus 44. However, the electrical circuit apparatus 144 includes a temperature transmission apparatus 184 that enables measurement of the center line fuel pellet temperature within the fuel rod 6. Specifically, the temperature transmission apparatus 184 includes a modified fuel pellet 186 that is modified to have a receptacle 187 formed therein. The temperature transmission apparatus 184 further includes a tungsten rod 189 that is an elongated element and that is received in the receptacle 187. While the elongated element 189 is depicted in the exemplary embodiment described herein as being formed of tungsten, it is understood that any of a wide variety of other refractory metals and alloys such as molybdenum and the like can be used in place of tungsten. The temperature transmission apparatus 184 further includes a ferritic rod 188 that is abutted against the tungsten rod 189, it being understood that the tungsten rod 189 is abutted with the modified fuel pellet 186. The inductor 156 includes a coil 190 that is situated directly on the ferritic rod 188.

Figure 7:
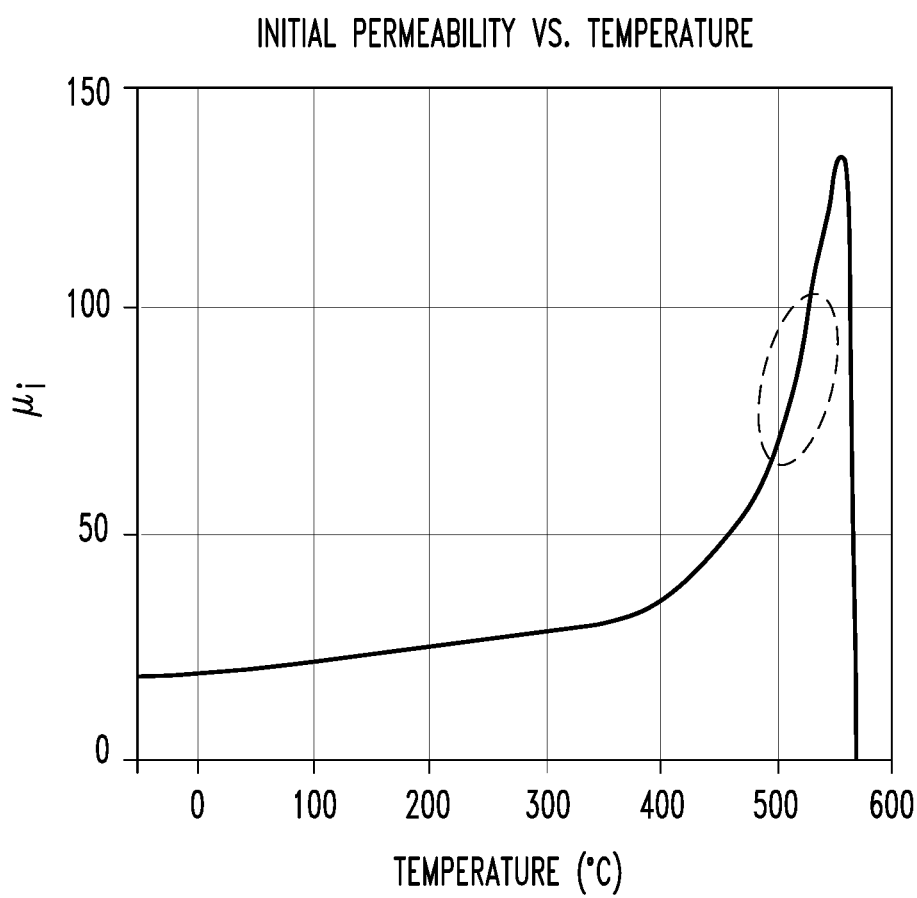
FIG. 7 is a graph depicting variation in permeability as a function of temperature of a ferritic rod of the electrical circuit apparatus of FIG. 6.

During operation, the heat that is generated by the fuel pellets 38 and the modified fuel pellet 186 is conducted through the tungsten rod 189 and thereafter through the ferritic rod 188, thereby causing the temperature of the ferritic rod 188 to correspond with the temperature of the fuel pellets 38 and the modified fuel pellet 186. The permeability of the ferritic rod 188 changes as a function of temperature, and the change in permeability with temperature is depicted in a graph that is shown generally in FIG. 7. A portion of the graph of FIG. 7 is encircled and demonstrates the temperature that is typically seen by the ferritic rod 188 after the heat from the modified fuel pellet 186 is transferred to the ferritic rod 188 by the tungsten rod 189 and demonstrates, due to the steepness of the curve at the indicated location in FIG. 7, the correlation between temperature of the ferritic rod 188 and permeability thereof.

The permeability of the ferritic rod 188 which, as noted, varies as a function of temperature, affects the inductance of the inductor 156 with the result that the frequency of the response pulse 78 that is output by the resonant circuit 150 varies directly with the permeability of the ferritic rod 188 and thus with the temperature of the fuel pellets 38 and the modified fuel pellet 186. As such, the temperature of the fuel pellets 38 and the modified fuel pellet 186 can be measured by detecting the response pulse 78 that is output by the resonant electrical circuit 150 through the use of the routines 28 and the retrieval from the data tables 30 of a temperature that corresponds with the detected frequency of the response pulse 78.

Figure 8:
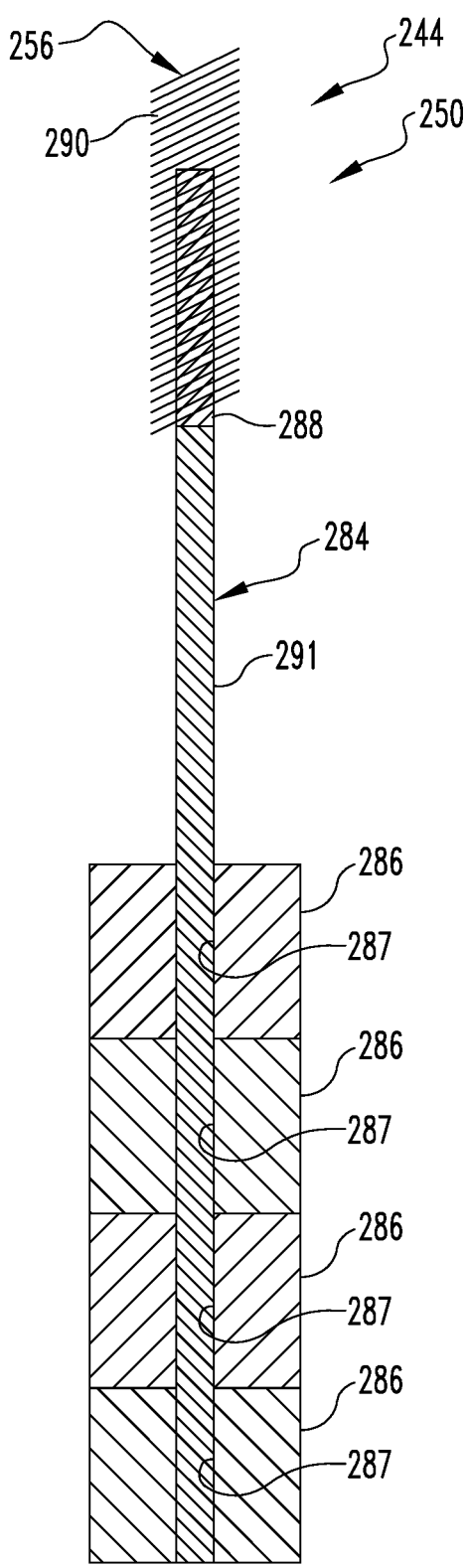
FIG. 8 is a schematic depiction of an electrical circuit apparatus in accordance with a third embodiment of the disclosed and claimed concept that can be used in a fuel rod such as is depicted generally in FIG. 2.

An improved electrical circuit apparatus 244 in accordance with a third embodiment of the disclosed and claimed concept is depicted in FIG. 8 and is usable in a fuel rod in a fashion similar to the electrical circuit apparatus 44. The electrical circuit apparatus 244 is receivable in the interior region 36 of the fuel rod 6 and includes a resonant electrical circuit 250 and a temperature transmission apparatus 284 that detect the temperature of a set of modified fuel pellets 286. The modified fuel pellets 286 each have a receptacle 287 formed therein. The temperature transmission apparatus 284 includes an amount of liquid metal 291 that is liquid during operation of the nuclear reactor 12. The temperature transmission apparatus 284 further includes a ferritic rod 288 that is engaged with the liquid metal 291 and is buoyantly floated thereon and is receivable in the interior of a coil 290 of an inductor 256 of the resonant electrical circuit 250. The liquid metal 291 expands and contracts with temperature increases and decreases, respectively, of the modified fuel pellets 286. The position of the ferritic rod 288 with respect to the coil 290 is thus directly dependent upon the centerline temperature of the modified fuel pellets 286. Such position of the ferritic rod 288 with respect to the coil 290 affects the inductance of the inductor 256 and therefore correspondingly affects the frequency of the resonant electrical circuit 250. The response pulse 78 that is generated by the resonant electrical circuit 250 thus is receivable by the receiver 72 and is communicated to the electronic processing apparatus 16, and the routines 28 and the data tables 30 are employed to determine a corresponding temperature of the modified fuel pellets 286 and thus of the corresponding fuel rod 6.

Figure 9:
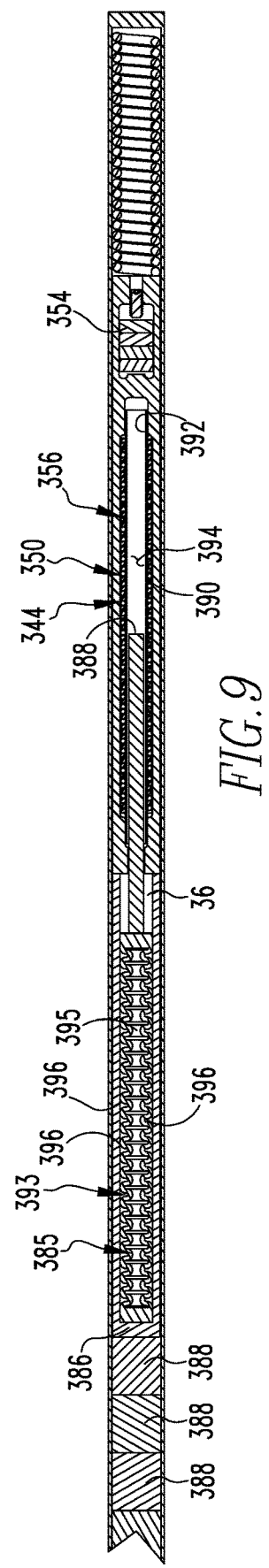
FIG. 9 is a schematic depiction of a fuel rod within which is situated an electrical circuit apparatus in accordance with a fourth embodiment of the disclosed and claimed concept.

FIG. 9 depicts an improved electrical circuit apparatus 344 in accordance with a fourth embodiment of the disclosed and claimed concept. The electrical circuit apparatus 344 is usable inside a fuel rod 6 and includes a resonant electrical circuit 350 and a pressure transmission apparatus 385. The pressure transmission apparatus 385 is configured to enable measurement of the ambient pressure within the interior of the fuel rod 6 and includes a support 386 that abuts the stack of fuel pellets 338. The pressure transmission apparatus 385 further includes a ferritic rod 388 and a vessel in the form of a bellows 393 having a hollow cavity 395 and further having a plurality of corrugations 396 formed therein. The hollow cavity 395 is open and is therefore in fluid communication with the interior region of the fuel rod 6. Moreover, an end of the bellows 393 opposite a ferritic rod 388 is affixed to the support 386.

The resonant electrical circuit 350 includes a capacitor 354 and further includes an inductor 356 having a coil 390 that is formed about the exterior of a hollow tube 392 having an interior 394 within which a ferritic rod 388 is receivable. The bellows 393 and the ferritic rod 388 are movably received on a support 386 and are biased by a spring in a direction generally toward the fuel pellets 338.

As is understood in the relevant art, as the nuclear reactor 12 is in operation, fission gases are produced that include one or more noble gases. Such fission gases increase the ambient pressure within the interior region of the fuel rod 6. Since the hollow cavity 395 is in fluid communication with the interior region of the fuel rod 6, the increased pressure in the interior region 36 bears upon bellows 393 within the hollow cavity 395 and causes the bellows 393 to expand axially, thereby moving the ferritic rod 388 with respect to the coil 390 and thereby affecting the inductance of the inductor 356. An increase in ambient pressure within the interior region 36 of the fuel rod 6 thus expands the bellows 393, thereby resulting in an incremental further reception of the ferritic rod 388 into the coil 390, which results in a corresponding change in inductance of the inductor 356.

The corresponding change in inductance of the inductor 356 affects in a predictable fashion the frequency of the resonant electrical circuit 350 and thus likewise affects the frequency of the response pulse 78 that is output by the resonant electrical circuit 350. As a result, when the response pulse 78 from the resonant electrical circuit 350 is received by the receiver 72 and is communicated to the electronic processing apparatus 16, the routines 28 and the data tables 30 are employed to obtain a corresponding value for the ambient pressure within the interior region 36 of the fuel rod 6. Such value for the ambient pressure can then be communicated to an enterprise data system of the nuclear reactor 12.

Figure 10:
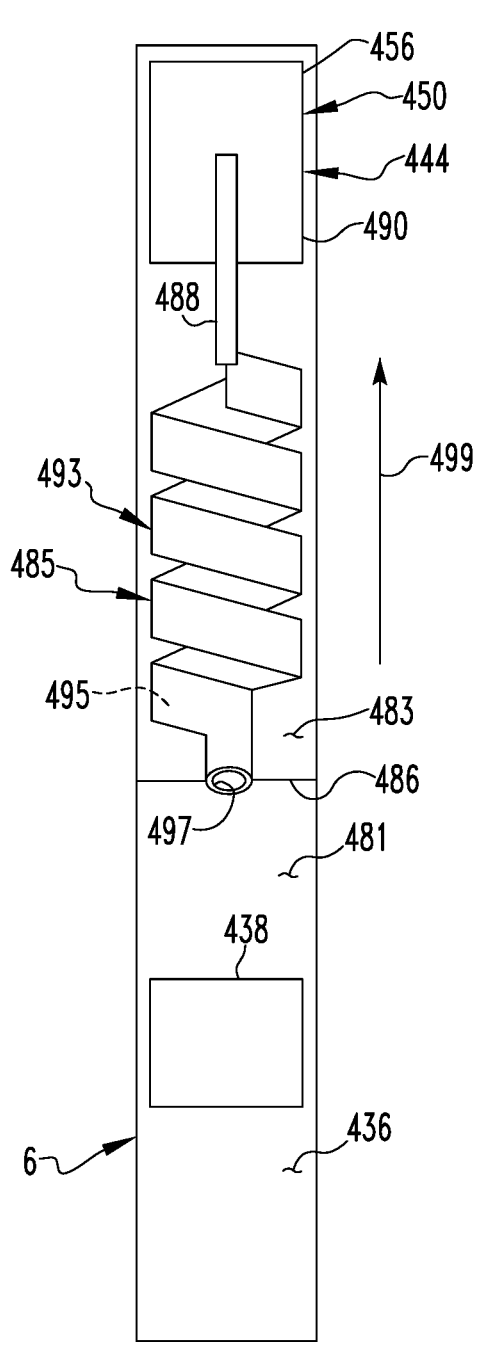
FIG. 10 is a schematic depiction of another fuel rod within which is situated another electrical circuit apparatus in accordance with a fifth embodiment of the disclosed and claimed concept.

An improved electrical circuit apparatus 444 in accordance with a fifth embodiment of the disclosed and claimed concept is depicted generally in FIG. 10. The electrical circuit apparatus 444 is situated within an interior region 436 of a fuel rod 6 and includes a resonant electrical circuit 450 that includes a capacitor and an inductor 456.

The electrical circuit apparatus 444 further includes a pressure transmission apparatus 485 that includes a vessel in the form of a Bourdon tube 493 which, in the depicted exemplary embodiment, includes a hollow tube that is formed in a helical shape. The hollow tube of the Bourdon tube 493 forms a hollow cavity 495, except that an inlet 497 is formed in an end of the Bourdon tube 493 and thus permits fluid communication with the interior of the Bourdon tube 493. More specifically, the electrical circuit apparatus 444 further includes a support 486 in the form of a seal that extends between the edges of the Bourdon tube 493 adjacent the inlet 497 and extends to an interior surface of the interior region 436 of the fuel rod 6. The support 486 thus divides the interior region 436 into a main portion 481 within which a number of fuel pellets 438 are situated and a sub-region 483 within which the Bourdon tube 493 and the inductor 456 are situated. The Bourdon tube 493 is also supported on the support 486. The support 486 resists fluid communication between the main portion 481 and the sub-region 483, except for the inlet 497 which permits fluid communication between the interior of the Bourdon tube 493 and the main portion 481.

The pressure transmission apparatus 485 further includes a ferritic rod 488 that is situated on the Bourdon tube 493 at an end thereof opposite the inlet 497. The inductor 456 includes a coil 490, and movement of the ferritic rod 488 in relation to the coil 490 changes the inductance of the inductor 456 such that the frequency of the response pulse 78 that is generated by the electrical circuit apparatus 444 changes corresponding to the ambient pressure within the main portion 481 of the interior region 436. More specifically, as fission gases accumulate in the main portion 481 of the interior region 436, the ambient pressure within the main portion 481 increases, as does the ambient pressure within the hollow cavity 495 of the Bourdon tube 493. Since the sub-region 483 does not experience the increased ambient pressure that is experienced by the main portion 481, and increase in the ambient pressure within the hollow cavity 495 of the Bourdon tube 493 results in expansion of the Bourdon tube 493 and resultant movement of the ferritic rod 488 in the direction of the arrow 499 with respect to the coil 490. This results in a corresponding change in the frequency of the response pulse 78 that is generated by the electrical circuit apparatus 444.

It thus can be seen that changes in ambient pressure within the main portion 481 of the interior region 436 result in a change in inductance of the inductor 456 and a corresponding change in the nominal frequency of the resonant electrical circuit 450 and a resultant change in the frequency of the response pulse 78 that is generated by the electrical circuit apparatus 444. When such response pulse 78 is received by the receiver 72, a corresponding signal is communicated to the electronic processing equipment 16, and the routines 28 and the data tables 30 are used to obtain a corresponding value for the ambient pressure within the interior region 436 for output as desired.

Figure 11:
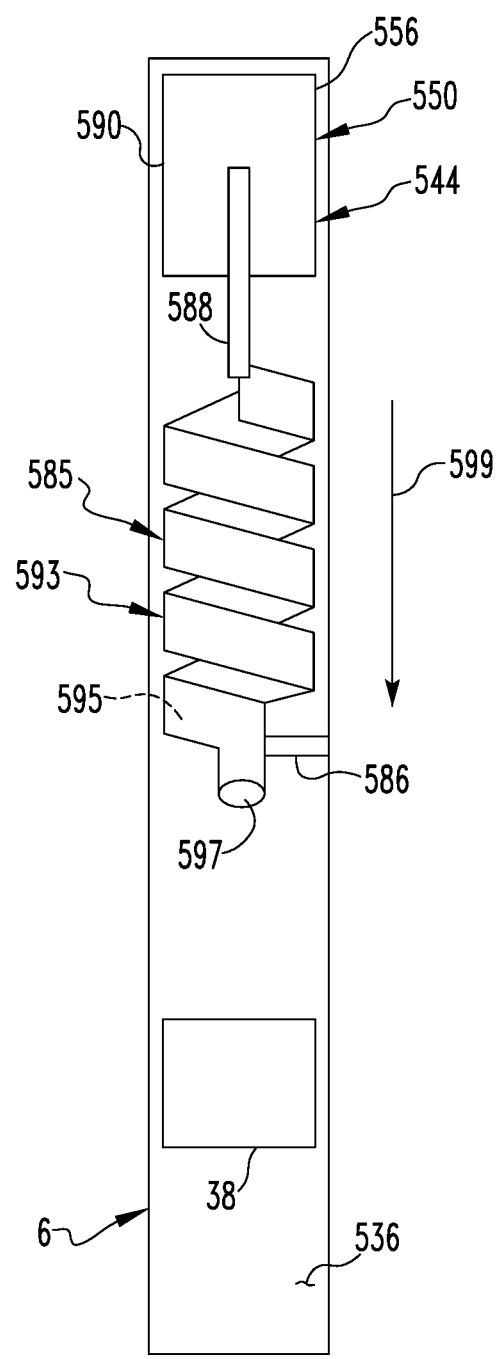
FIG. 11 is a schematic depiction of another fuel rod within which is situated another electrical circuit apparatus in accordance with a sixth embodiment of the disclosed and claimed concept.
Figure 12:
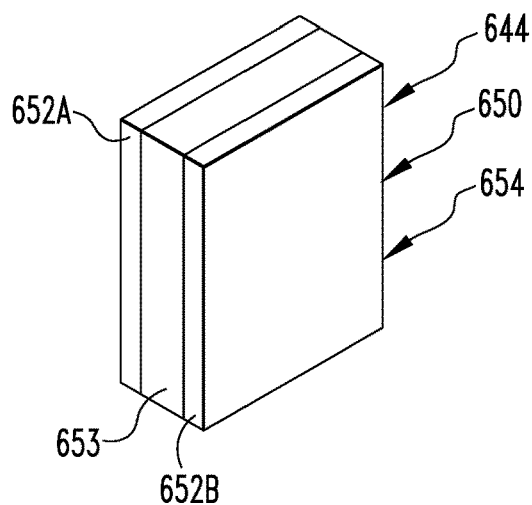
FIG. 12 is a schematic depiction of another electrical circuit apparatus in accordance with a seventh embodiment of the disclosed and claimed concept that can be used in a fuel rod such as is depicted generally in FIG. 2.

An improved electrical circuit apparatus 544 in accordance with a sixth embodiment of the disclosed and claimed concept is depicted generally in FIG. 11. The electrical circuit apparatus 544 is similar to the electrical circuit apparatus 444 in that a Bourdon tube 593 is employed as a vessel having a hollow cavity 595. In the electrical circuit apparatus 544, however, the Bourdon tube 593 includes a plug 597 at an end thereof opposite a ferritic rod 588 such that the hollow cavity 595 of the Bourdon tube is not in fluid communication with the interior region 536 of the fuel rod 6, and an increase in ambient pressure within the interior region 536 causes the Bourdon tube 593 to contract. The Bourdon tube 493 is supported on a support 586 in the vicinity of the plug 597, and a contraction of the Bourdon tube 493 due to increased ambient pressure within the interior region 536 thus moves the ferritic rod 588 in the direction of the arrow 599 with respect to the coil 590.

The electrical circuit apparatus 544 includes a resonant electrical circuit 550 having a capacitor and an inductor 556, and movement of the ferritic rod 588 with respect to the coil 590 of the inductor 556 changes the inductance of the inductor 556 and thus changes the nominal frequency of the resonant electrical circuit 550. The electrical circuit apparatus 544 thus includes a pressure transmission apparatus 585 that is similar to the pressure transmission apparatus 485, except that the pressure transmission apparatus 585 includes a Bourdon tube 593 whose hollow cavity 595 is not in fluid communication with the interior region 536 and thus contracts in the presence of an increased ambient pressure within the interior region 536.

An improved electrical circuit apparatus 644 in accordance with a seventh embodiment of the disclosed and claimed concept includes a resonant electrical circuit 650 having a capacitor 654 and an inductor. The capacitor 654 includes a pair of plates 652A and 652B that are separated by a dielectric material 653. The electrical circuit apparatus 644 is receivable within the interior region 36 of a fuel rod 6 in order to output a response pulse 78 whose frequency is adjusted responsive to a change in ambient pressure within the interior region 36 of the fuel rod 6.

More specifically, the dielectric 653 is hygroscopic in nature and is configured to absorb at least some of the fission gases that are generated during operation of the nuclear reactor 12. Such absorption of the fission gases by the dielectric 653 changes the dielectric constant of the dielectric 653, which adjusts the capacitance of the capacitor 654, with a corresponding effect on the frequency of the response pulse 78 that is generated by the resonant electrical circuit 650. As such, a change in the ambient pressure within the interior region 36 of the fuel rod 6 correspondingly affects the capacitance of the capacitor 654 and thus likewise correspondingly affects the frequency of the response pulse 78 that is generated by the resonant electrical circuit 650. When the response pulse 78 is received by the receiver 72, the receiver 72 responsively provides to the electronic processing apparatus 16 a signal which is used by the routines 28 in conjunction with the data tables 30 to obtain and output a value for the ambient pressure within the interior region 36 of the fuel rod 6 within which the electrical circuit apparatus 644 is situated.

Figure 13:
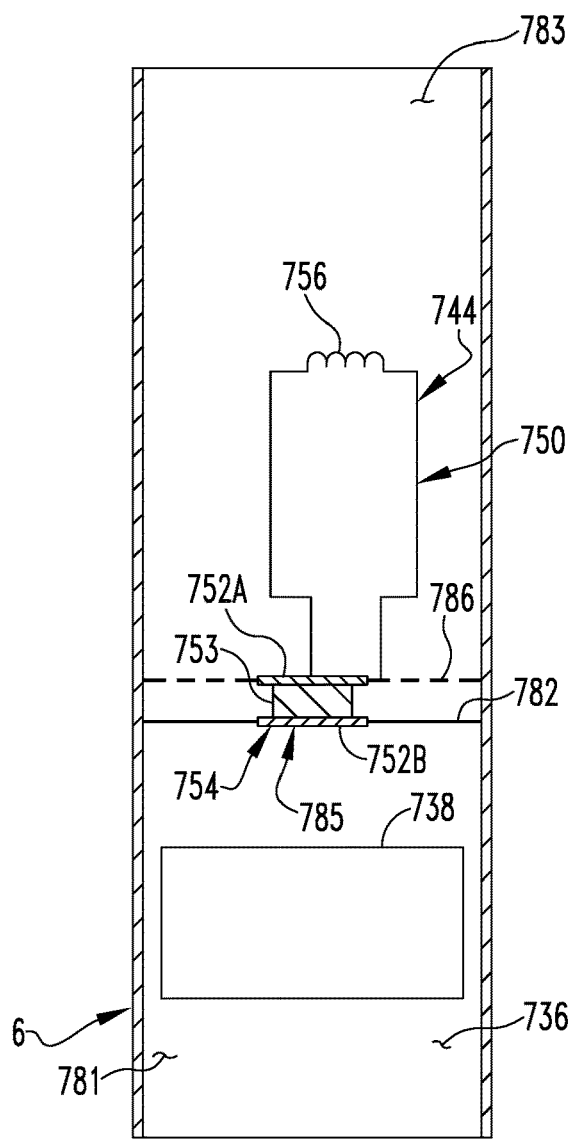
FIG. 13 is a schematic depiction of another fuel rod within which is situated another electrical circuit apparatus in accordance with an eighth embodiment of the disclosed and claimed concept.

An electrical circuit apparatus 744 in accordance with an eighth embodiment of the disclosed and claimed concept is depicted generally in FIG. 13 as being situated within an interior region 736 of a fuel rod 6. The electrical circuit apparatus includes a resonant electrical circuit 750 that includes a capacitor 754 and an inductor 756.

The electrical circuit apparatus 744 includes a pressure transmission apparatus 785 that includes a support 786 upon which the capacitor 756 is situated in a stationary fashion and further includes a flexible seal 782. More specifically, the capacitor 754 includes a pair of plates 752A and 752B with a dielectric material 753 interposed therebetween. The plate 752A is situated on the support 786, and the flexible seal extends between the plate 752B and an interior surface of the fuel rod 6 to divide the interior region 736 into a main portion 781 within which a number of fuel pellets 738 are situated and a sub-region 783 within which the inductor 756, the plate 752A, the support 786, and the dielectric 753 are situated. The support 786 is rigid but has a number of openings formed therein such that an increase or decrease in the ambient pressure within the main portion 781 will result in movement of the flexible seal 782 with respect to the support 786. The flexible seal 782 thus resists fluid communication between the main portion 781, which is the location where the fission gases are generated, and the sub-region 783.

When the main portion 781 experiences a change in the ambient pressure within the main portion 781, this causes the flexible seal 782 and the plate 752B to move with respect to the plate 752A which, being situated on the support 786, remains stationary. The dielectric material 753 is configured to be at least partially flexible in response to movement of the plate 752B with respect to the plate 752A. However, such movement of the plate 752B with respect to the plate 752A results in a change in the capacitance of the capacitor 754. This results in a corresponding change in the frequency of the response pulse 78 that is generated by the resonant electrical circuit 750 as a result of a change in the ambient pressure within the main portion 781. It thus can be understood that a change in ambient pressure within the main portion 781 of the interior region 736 correspondingly changes the frequency of the response pulse 78 that is received by the receiver 72 and which resultantly communicates a signal to the electronic processing apparatus 16. The electronic processing apparatus 16 then employs its routines 28 and its data tables 30 to determine a pressure value that corresponds with the frequency of the response pulse 78 and which is indicative of the ambient pressure within the main portion 781 of the interior region 736.

It thus can be seen that various electrical circuit apparatuses are provided that are able to directly measure parameters such as ambient pressure, centerline fuel pellet temperature, and fuel pellet elongation within the various fuel rods 6 of the fuel assembly 10. As noted, any of the electrical circuit apparatuses can include the calibration circuit that is usable to compensate for component degradation and temperature drift. In addition to the direct measurement of the parameters such as centerline fuel pellet temperature, fuel pellet elongation, and ambient pressure within the interior region of the fuel rods 6, it is reiterated that the response pulse 78 in certain circumstances can be analyzed in terms of its peak amplitude, frequency, and rate of decay in order to indirectly and simultaneously indicate a plurality the same parameters of the fuel rods 6. Other variations will be apparent.

A first embodiment of an improved dry cask storage system (DCSS) 802 in accordance with the disclosed and claimed concept is depicted generally in FIGS. 14-17. The DCSS 802 includes a detection apparatus 804 that shares some similarity with the detection apparatus 4. The detection apparatus 804 is situated internal to the DCSS 802 and is structured to provide an output signal to an electronic processing apparatus 808 that is situated external to and likely remote from the DCSS 802.

The DCSS 802 is configured to store therein an amount of Spent Nuclear Fuel (SNF) 812. More particularly, the DCSS 802 includes, in addition to the detection apparatus 802, a vessel 816 within which the SNF 812 is situated and an overpack 820 that encloses therein the vessel 816. The vessel 816 is of a roughly cylindrical configuration and is formed from a wall 824 that is manufactured out of a metallic material and which has a cylindrical lateral wall component and a pair of circular end wall components which are affixed together to form a sealed enclosure. In particular, the vessel 816 is configured to include a first interior region 828 that is sealed from communication with the atmosphere surrounding the DCSS 802. The SNF 812 is received, stored, and enclosed within the first interior region 828.

The overpack 820 can be said to include a body 832 that is formed of a cementitious material such as concrete and which includes a lateral annular wall component and a pair of circular end wall components that together form the body 832. The overpack 820 is formed to have a second interior region 836 within which the vessel 816 is received. As can be understood from FIG. 16, however, an annulus 840, which is a region of empty space, is formed between the body 832 and the wall 824. The body 832 has a number of openings 844 formed therein that provide communication between the annulus 840, which is a part of the second interior region 836, and the exterior of the overpack 820.

Figure 15:
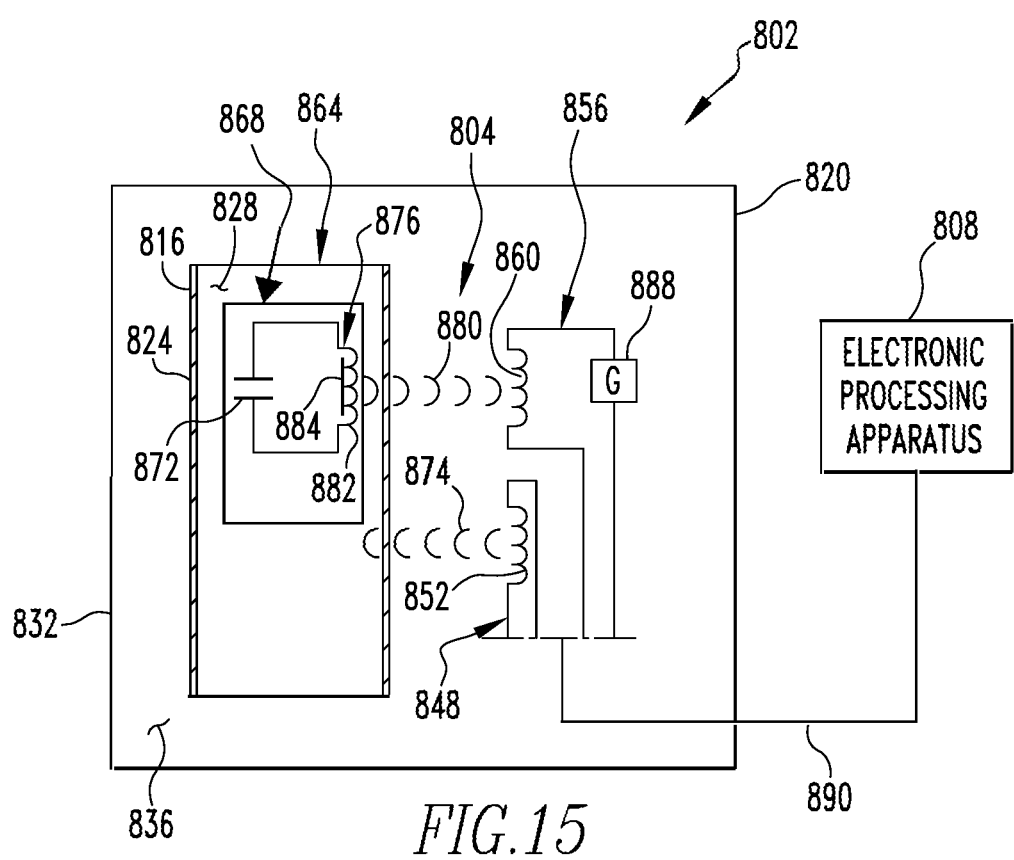
FIG. 15 is a schematic depiction of the DCSS of FIG. 14.

As is best shown in FIG. 15, the detection apparatus 804 can be said to include a transmitter 848 having a transmitter antenna 852, a receiver 856 having a receiver antenna 860, and an electrical circuit apparatus 864 that includes a resonant electrical circuit 868. The resonant electrical circuit 868 is situated with the SNF 812 within the first interior region 828 and is enclosed therein within the vessel 816. The resonant electrical circuit 868 includes a number of circuit components including a capacitor 872 and an inductor 876 that together form a resonant circuit when the inductor 876 is energized by an excitation pulse 874 that is generated by the transmitter 848 and which is similar to the excitation pulse 74. Specifically, the excitation pulse 874 is transmitted by the transmitter antenna 852 through the wall 824 and energizes a coil 882 of the inductor 876 and, together with the capacitor 872, forms a resonant circuit. It is noted, however, that the inductor 876 additionally includes a core 884 that is advantageously formed of a particular perminvar material having a high magnetic permeability and a high Curie point. In the depicted exemplary embodiment, the perminvar material used to form the core 884 is a high temperature NiZn perminvar ferrite material that is manufactured and sold by National Magnetics Group, Inc., of Bethlehem, Pa., USA under the name "M3". This particular type of perminvar advantageously has a magnetic permeability that varies in a known fashion in response to a change in temperature. This relationship is similar to that depicted in FIG. 7 in the context of the ferritic rod 188, but which is equally applicable to the core 884. Since the magnetic permeability of the core 884 varies with temperature, the frequency of the resonant electrical circuit 868 advantageously correspondingly varies with temperature within the first interior region 828.

When the resonant electrical circuit 868 is energized by the excitation pulse 874 that is generated by the transmitter 848 and that is transmitted through the wall 824 by the transmitter antenna 852, the resonance of the resonant electrical circuit 868 is directly responsive to and is indicative of the temperature within the first interior region 828 of the vessel 816 where the SNF 812 is situated. In response to the excitation pulse 874 from the transmitter 848, the resonant electrical circuit 868 becomes energized and generates a response pulse 880 whose frequency is based upon the resonant frequency of the resonant electrical circuit 868 which, as noted hereinbefore, is based upon the temperature of the first interior region 828 due to variable magnetic permeability of the core 884. The response pulse 880 that is generated by the resonant electrical circuit 868 is similar to the response pulse 80 and is in the form of a decaying sine wave having properties such as peak amplitude, frequency, and rate of decay, such as is depicted generally in FIGS. 5A and 5B in the context of the electrical circuit apparatus 44. The response pulse 880 is transmitted in the form of a magnetic field signal that travels through the wall 824, which is metallic, and is received by the receiver antenna 860, which is situated within the second interior region 836, but which is situated external to the vessel 816. The frequency of the response pulse is optimized for transmission through the wall 824 and for detection by the receiver 856 in order to determine a temperature within the first interior region 828, and in the depicted exemplary embodiment the response pulse 880 has a frequency that is approximately in the range of about 1000-2000 Hz, although other frequencies can be employed without departing from the spirit of the instant disclosure.

The receiver 856, in response to having received the response pulse 880 with the receiver antenna 860, generates an output that is communicated to the electronic processing apparatus 808. The output has a characteristic such as frequency that is based upon the properties of the capacitor 872 and the inductor 876, i.e., upon the frequency of the resonant circuit that is, itself, based upon the temperature within the first interior region 828. This enables a determination by the electronic processing apparatus 808 and from the output a temperature that exists within the first interior region 828. The temperature is then communicated by the electronic processing apparatus 808 to, for instance, an enterprise data system or is otherwise utilized. In this regard, it is understood that the variation of the magnetic permeability of the core 884 as a function of temperature typically would be an undesirable property of the perminvar material from which the core 884 is formed, but in the instant application such variability of the magnetic permeability with temperature is advantageously employed in order to vary the resonant frequency of the resonant electrical circuit 868 in order to advantageously indicate the temperature within the first interior region 828.

It can be understood that the receiver antenna 860 will receive the excitation pulse 874 in a fashion similar to the way in which the resonant electrical circuit 868 receives the excitation pulse 874, except that the receiver antenna 860 will receive it earlier due to its closer proximity with the transmitter antenna 852. The excitation pulse 874 is generally of much greater magnitude and energy than the detected response pulse 880, and the detection apparatus 804 is advantageously configured to avoid destruction of the receiver 856 and its associated electronics due to the excitation pulse 874 being received by the receiver antenna 860. In particular, the receiver 856 advantageously additionally includes a variable gain amplifier in the exemplary form of a gating circuit 888, indicated at "G" in FIG. 15, that is switchable between an OFF state and an ON state. The gating circuit 888 in the OFF state attenuates the signal that is received by the receiver antenna 860 by three orders of magnitude in the depicted exemplary embodiment such that if the excitation pulse 874 when received by the receiver antenna 860 would ordinarily result in an output on the order of one volt, such attenuation of that signal by three orders of magnitude would result in an attenuated signal that is on the order of a millivolt. The gating circuit 888 thus advantageously avoids destruction of the detection apparatus 804 in response to the excitation pulse 874.

The gating circuit 888 is then advantageously switched from the OFF condition to the ON condition a predetermined period of time after initiation of the excitation pulse 874. In the depicted exemplary embodiment, the gating circuit 888 is switched from the OFF condition to the ON condition 250 microseconds after the initiation of the excitation pulse, although it is understood that other predetermined periods of time greater than or less than this aforementioned period of time can be employed without departing from the sprit of the instant disclosure. After this predetermined period of time, at which point the gating circuit 888 is switched from the OFF condition to the ON condition, the response pulse 880 that is received by the receiver antenna 860 is communicated as an output signal to the electronic processing unit 808 for use in determining the temperature within the first interior region 828. It thus can be seen that the gating circuit 888 attenuates a portion of the output from the receiver 856 that corresponds with the excitation pulse 874 but then ceases such attenuation a predetermined period of time after the excitation pulse 874 in order to permit the response pulse 880 to be detected by the receiver antenna 860 and to be provided as an output signal from the receiver 856, with such output signal being employed as an input into the electronic processing apparatus 808 in order to determine the temperature within the first interior region 828.

Figure 14:
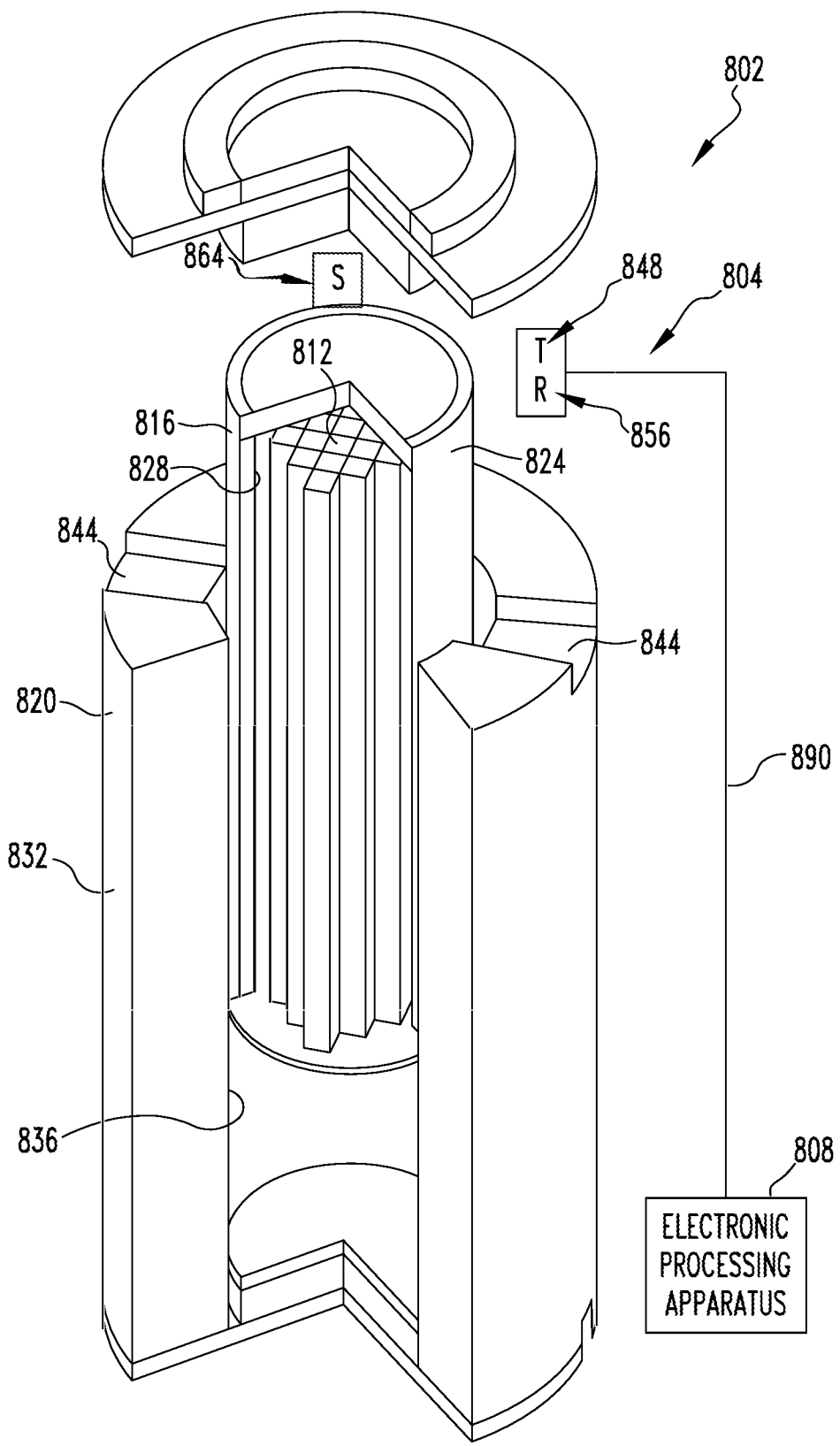
FIG. 14 is an exploded perspective view, partially cut away, of a first embodiment of an improved Dry Cask Storage System (DCSS) in accordance with the disclosed and claimed concept.
Figure 16:
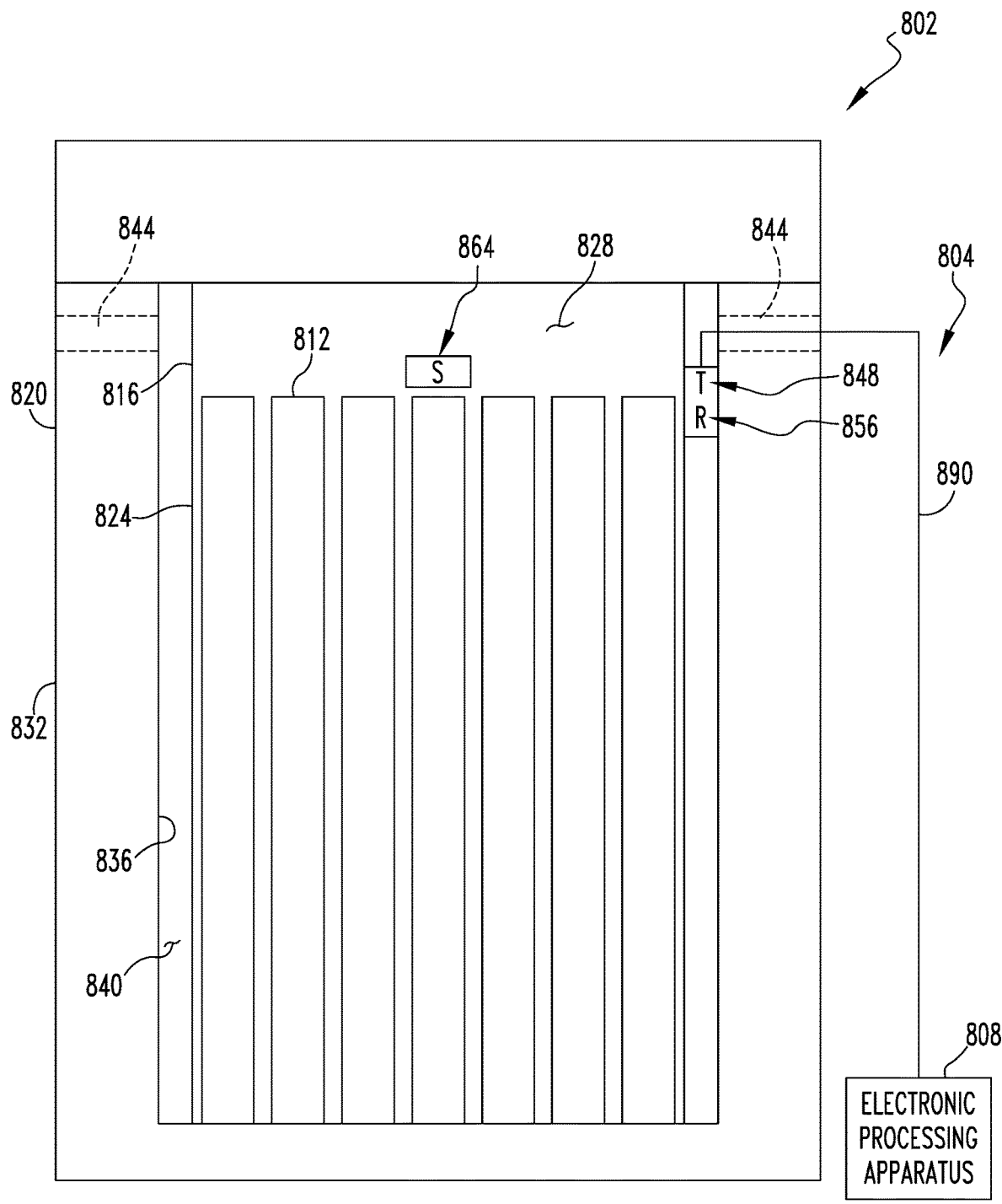
FIG. 16 is an elevational view, partly cut away, of the DCSS of FIGS. 14 and 15.
Figure 17:
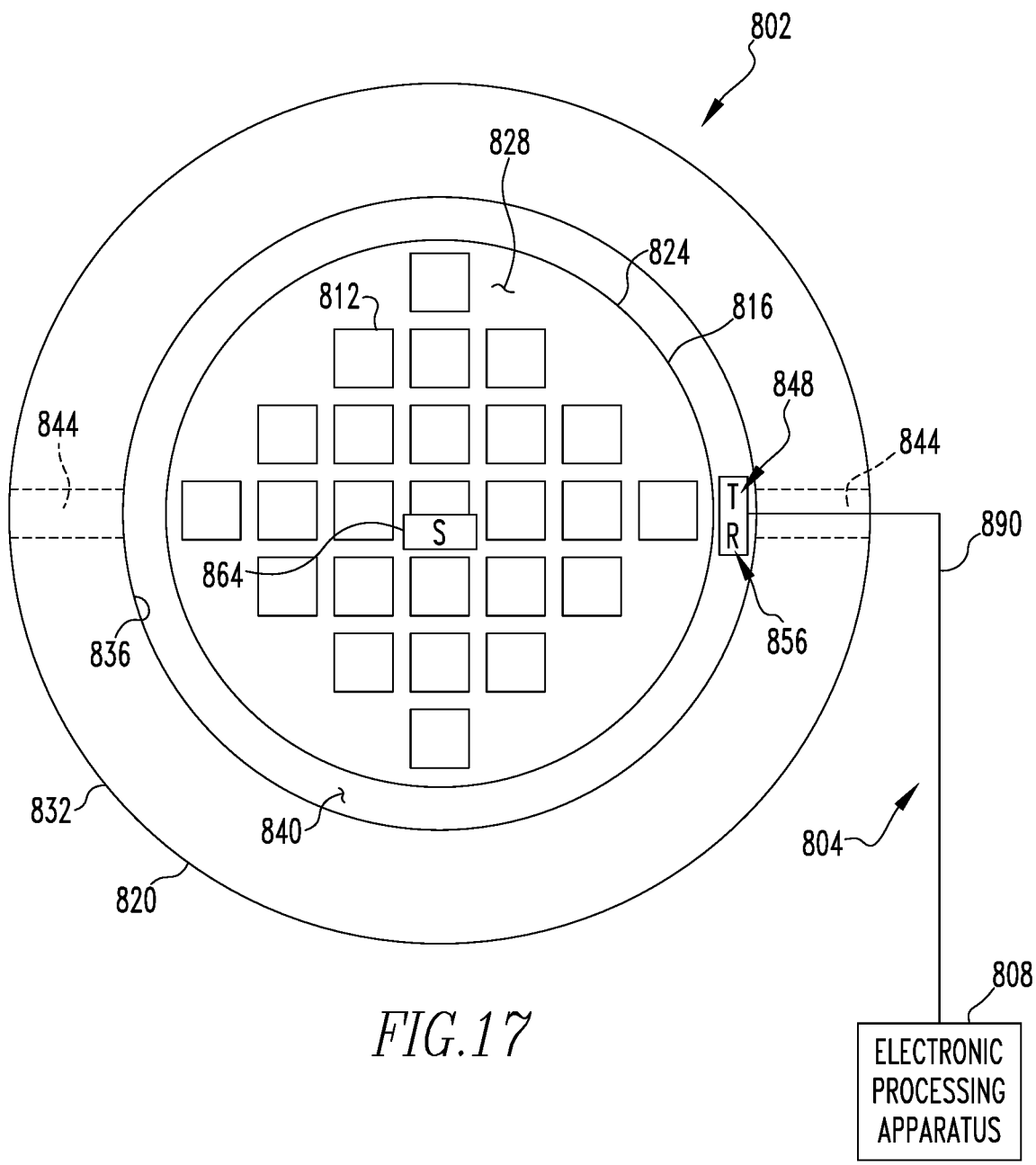
FIG. 17 is a plan view, partially cut away, of the DCSS of FIGS. 14-16.

As can be understood from FIG. 17, the electrical circuit apparatus 864, designated with the letter "S" in FIGS. 14 and 16-17, is situated approximately centrally within the vessel 816, and it can be understood from FIG. 16 that it is situated near the upper end of the SNF 812. The transmitter 848 and receiver 856 are positioned within the annulus 840 at an optimum position with respect to the electrical circuit apparatus 864. A wire 890 extends through one of the openings 844 between a transceiver that is formed by the transmitter 848 and the receiver 856 and the electronic processing apparatus 808. As such, while the electrical circuit apparatus 864 is sealed within the first interior region 828 of the vessel 816, the transmitter 848 and receiver 856 are situated within the annulus 840, which is in communication with the exterior of the DCSS 802. The electrical circuit apparatus 864 thus serves as a self-powered sensor that generates the response pulse 880 that is representative of the temperature within the first interior region 828.

Figure 18:
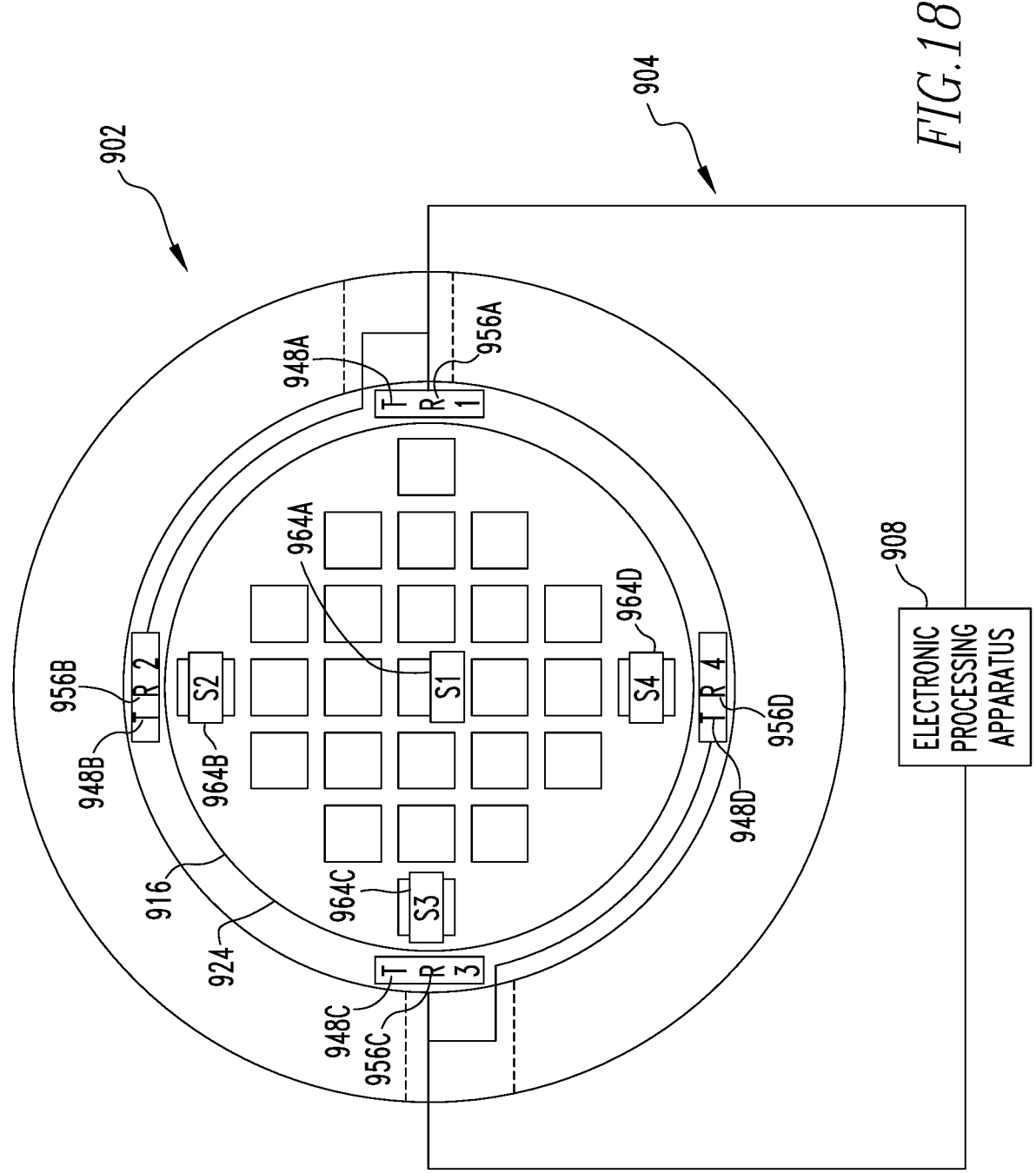
FIG. 18 is a top plan view, partially cut away, of a second embodiment of a DCSS in accordance with the disclosed and claimed concept.

In contrast with the DCSS 802 of FIGS. 14-17, it is noted that a second embodiment of a DCSS 902 is depicted generally in FIG. 18 as including a detection apparatus 904 that communicates with an electronic processing apparatus 908, but the detection apparatus 904 includes a plurality of transmitters, receivers, and electrical circuit apparatuses. More specifically, FIG. 18 depicts the detection apparatus 904 as including a plurality of transmitters that are indicated at the numerals 948A, 948B, 948C, and 948D, which may be collectively or individually referred to herein with the numeral 948. The detection apparatus 904 further includes a plurality of receivers that are indicated generally at the numerals 956A, 956B, 956C, and 956D, and which may be collectively or individually referred to herein with the numeral 956. The detection apparatus 904 additionally includes a plurality of electrical circuit apparatuses that are indicated at the numerals 964A, 964B, 964C, and 964D, and which may be collectively or individually referred to herein with the numeral 964. Each electrical circuit apparatus 964 is similar to the electrical circuit apparatus 864 and is paired with a particular one of the transmitters 948 and a particular one of the receivers 956. When a particular transmitter 948 generates an excitation pulse, similar to the excitation pulse 874, its corresponding electrical circuit apparatus 964 generates a response pulse that is similar to the response pulse 880 and that is communicated in the form of a magnetic field signal through a metallic wall 924 of a vessel 916 of the DCSS 902 and is detected by the corresponding receiver 956 which generates a corresponding output that is communicated to the electronic processing apparatus 908. For instance, an excitation pulse that is generated by the transmitter 948A energizes the resonant electrical circuit of the electrical circuit apparatus 964A which, in turn, generates a response pulse that is detected by the receiver 956A. In this regard, it is understood that the transmitters 948 will be sequentially triggered to generate the excitation pulse, one after the other, which will sequentially result in the generation of response pulses by the corresponding electrical circuit apparatuses 964 and resultant detection of the response pulses by the corresponding receivers 956 for communication to the electronic processing apparatus 908. In this regard, it can be understood that the electrical circuit apparatuses 964 are depicted in FIG. 18 as being situated at various locations within the vessel of the DCSS 902 and are designated with "S1", "S2", "S3", and "S4". The transmitter/receiver pairs 948 and 956 are situated in the annulus between the vessel and an overpack of the DCSS 902.

The detection apparatus 904 can employ any of a wide variety of devices and methodologies to distinguish from one another the various response pulses that are detected at the receivers 956. For instance, each of the receivers 956 could additionally include a gating circuit, similar to the gating circuit 888, which can be switched between an OFF condition and an ON condition at predetermined times with respect to the excitation pulse that was generated by the corresponding transmitter 948 in order to detect and communicate to the electronic processing apparatus 908 only the signal that was received from the corresponding electrical circuit apparatus 964. Other methodologies based upon timing, signature frequency, and the like can be employed in order to distinguish the various signals that are detected by the receivers 956. The positioning of the various electrical circuit apparatuses 964 across the vessel 916 advantageously permits different temperatures to be detected at different locations within the interior of the vessel 916.

Figure 19:
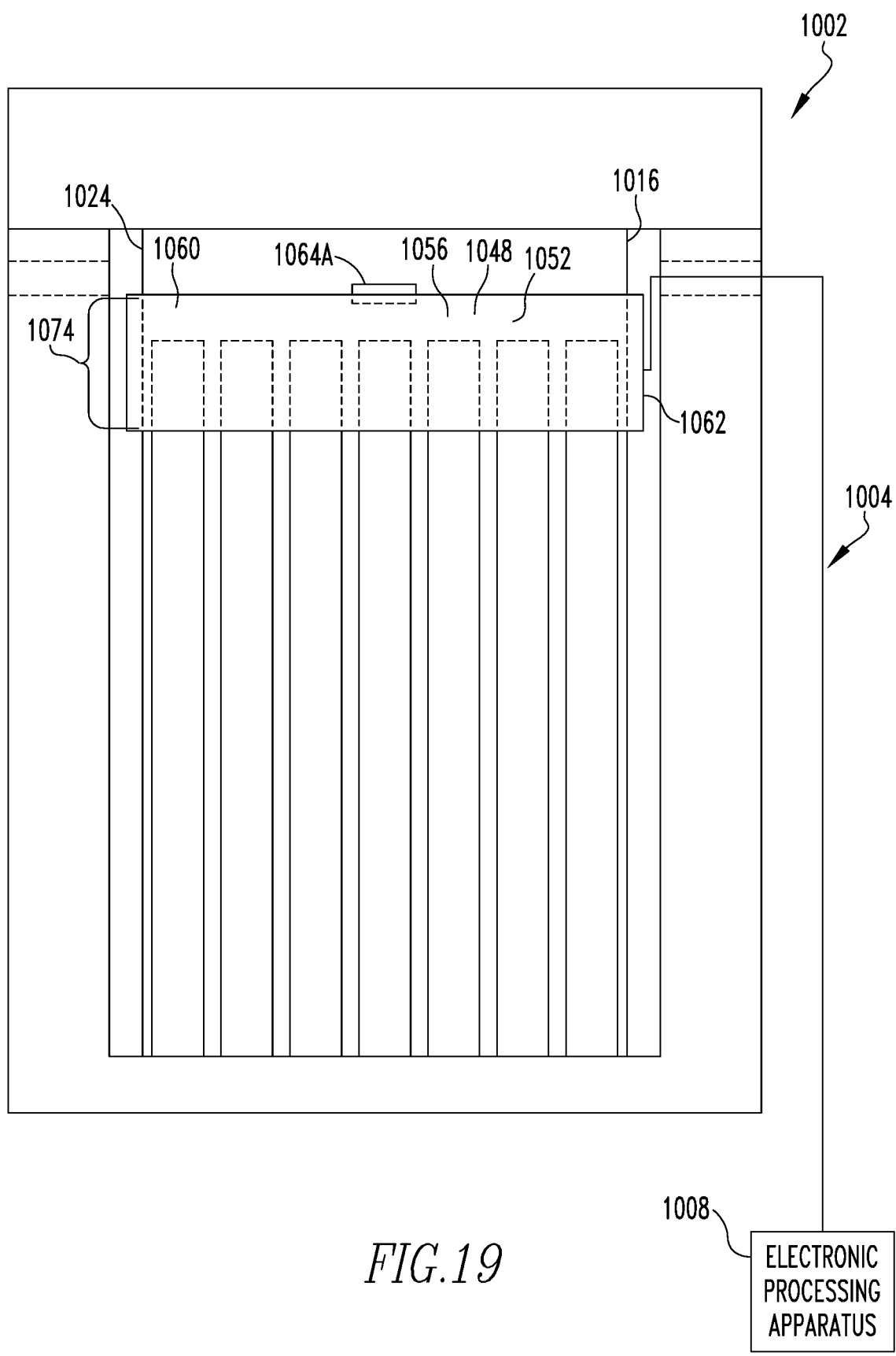
FIG. 19 is a front elevational view, partially cut away, of a third embodiment of a DCSS in accordance with the disclosed and claimed concept.
Figure 20:
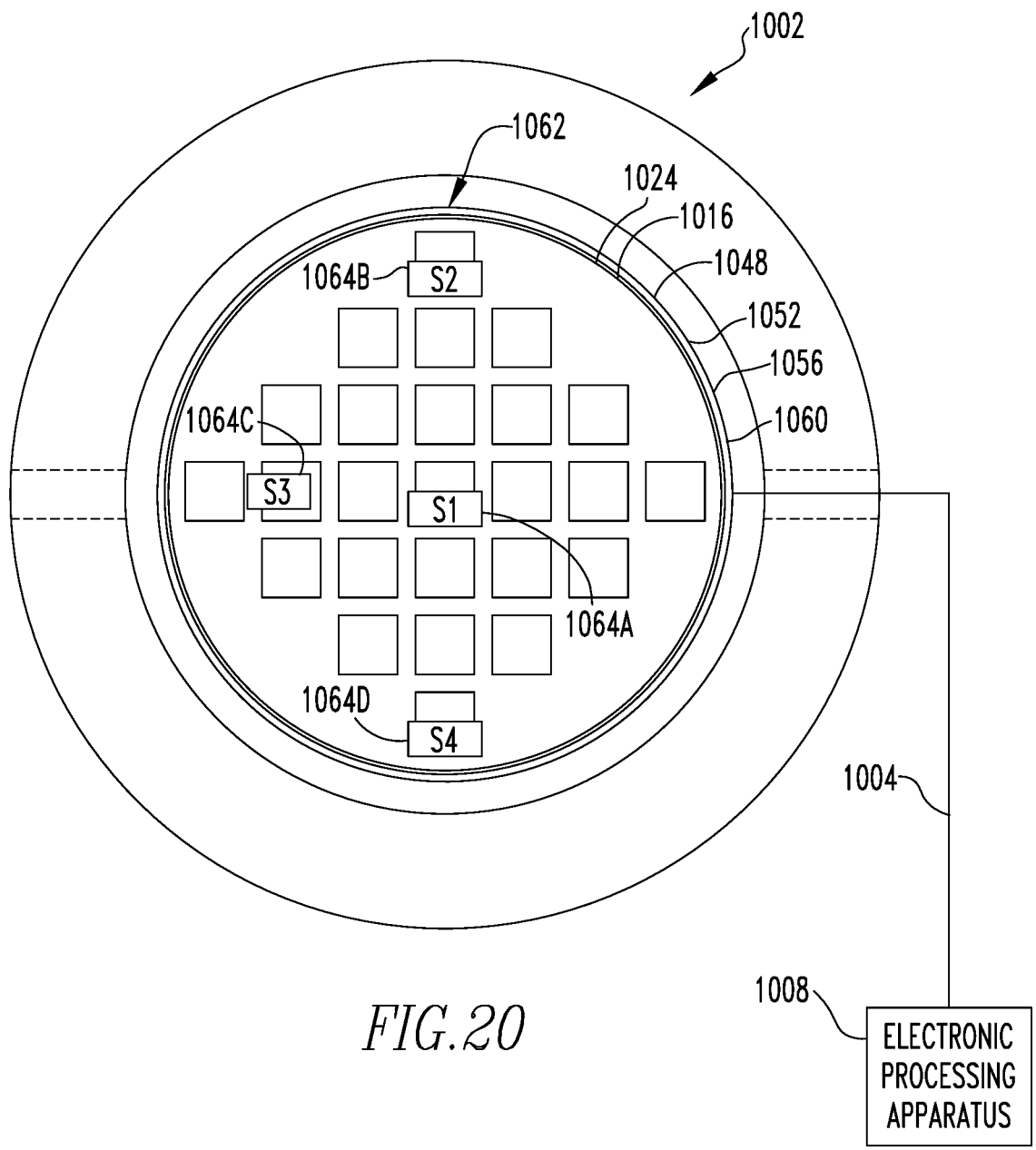
FIG. 20 is a top plan view, partially cut away, of the DCSS of FIG. 19.
Figure 21:
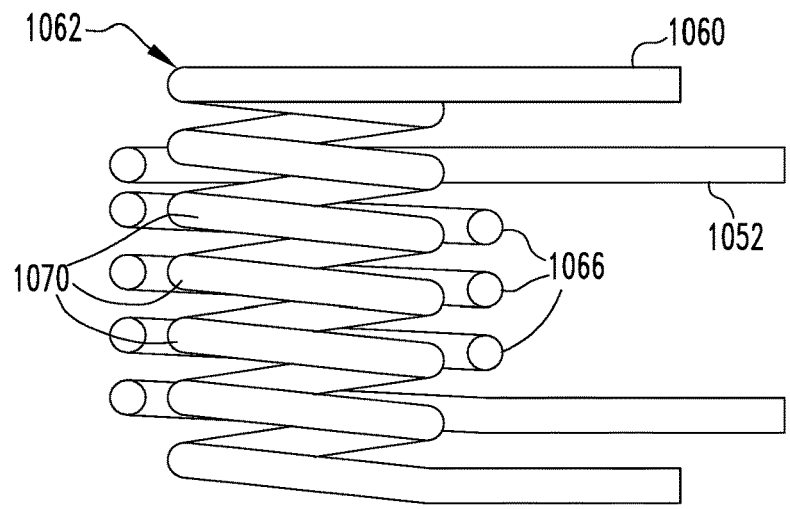
FIG. 21 is a depiction of an antenna apparatus of the DCSS of FIG. 19 in a condition exploded away from a vessel of the DCSS.
Figure 22:
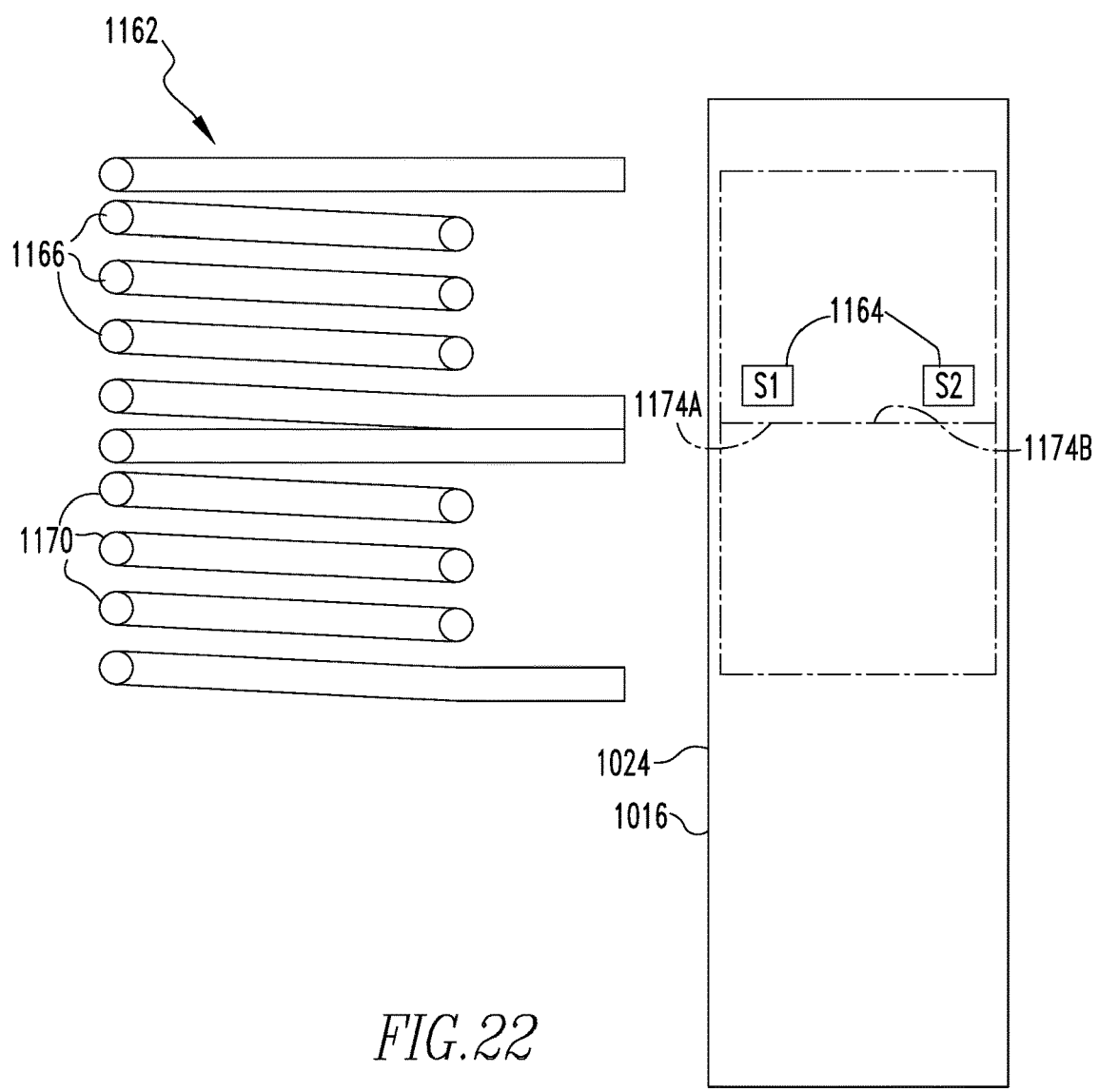
FIG. 22 is a view similar to FIG. 21, except depicting an alternative arrangement of an antenna apparatus that is usable with the DCSS of FIG. 19.

A third embodiment of an improved DCSS 1002 is depicted generally in FIGS. 19-21, with an alternative configuration of a portion thereof being depicted in FIG. 22. The DCSS 1002 includes a detection apparatus 1004 that is internal to the DCSS 1002 and that communicates signals to an electronic processing apparatus 1008 that is external to the DCSS 1002. The detection apparatus 1004 includes a transmitter 1048 having a transmitter antenna 1052 and a receiver 1056 having a receiver antenna 1060. The detection apparatus 1004 further includes a plurality of electrical circuit apparatuses that are indicated generally at the numerals 1064A, 10064B, 1064C, and 1064D, and which may be collectively or individually referred to herein with the numeral 1064. The electrical circuit apparatuses 1064 are similar to the electrical circuit apparatuses 964 and the electrical circuit apparatus 864. The transmitter antenna 1052 and the receiver antenna 1060 together form an antenna apparatus 1062.

As can be understood from FIG. 21, the transmitter antenna 1052 is in the form of a number of first windings 1066 of wire, with the first windings 1066 being of an annular configuration. In a similar fashion, the receiver antenna 1060 is in the form of a number of second windings 1070 of wire that are likewise of an annular configuration, with the first and second windings 1066 and 1070 overlying one another. In the depicted exemplary embodiment, the transmitter antenna 1052 is formed of a relatively thicker wire with relatively fewer windings whereas the receiver antenna 1060 is formed of a relatively thinner wire with relatively more turns. When the antenna apparatus 1062 is installed over a vessel 1016 of the DCSS 1002, such as is depicted in FIG. 19, the antennal apparatus 1062 circumscribes a portion 1074 of the vessel 1016.

As can be understood from FIG. 20, the electrical circuit apparatuses 1064 are situated at various positions within the vessel 1016. When the transmitter antenna 1052 transmits an excitation pulse that is generated by the transmitter 1048 and that is similar to the excitation pulse 874, the excitation pulse energizes the resonant electrical circuits in each of the electrical circuit apparatuses 1064, causing each of them to generate response pulses that are similar to the response pulse 880 and that are communicated as magnetic field signals through a wall 1024 of the vessel 1016 and are detected by the receiver antenna 1060. The receiver 1056 in turn generates an output that is provided to the electronic processing apparatus 1008 and that is indicative of the various temperatures at the locations where the various electrical circuit apparatuses 1064 are situated within the interior of the vessel 1016. Since the signals from the plurality of electrical circuit apparatuses 1064 are being received by the single receiver antenna 1060, various techniques may be employed to distinguish one response pulse from another in order to determine which electrical circuit apparatus 1064 generated which response pulse. For instance, frequency signatures may be employed in the various electrical circuit apparatuses 1064, or known time lags between generation of the excitation pulse and reception of the response pulses, or still other techniques, may be employed. It is also noted that the receiver 1056 may include a gating circuit like the gating circuit 888 as needed in order to avoid destruction of the detection apparatus 1004 due to the excitation pulse being received by the receiver antenna 1060.

FIG. 22 depicts an alternative antenna apparatus 1162 that can be employed in the DCSS 1002 in place of the antenna apparatus 1062. The antenna apparatus 1162 includes a number of first windings 1166 that are usable as a transmitter antenna and a number of second windings 1160 that are usable as a receiver antenna, but the first and second windings 1166 and 1170 are situated side-by-side rather than overlying one another. As such, the first windings 1166 circumscribe one portion 1174A of the vessel 1016 whereas the second windings 1170 circumscribe another portion 1174B of the vessel 1016 when the antenna apparatus 1162 is installed on the vessel 1016. Such a configuration can provide even greater distinction between the electrical circuit apparatuses 1164 that are employed in the DCSS 1002, two of which are depicted in FIG. 22.

Further advantageously, the DCSS 802, the DCSS 902, and the DCSS 1002 can each incorporate any of the aforementioned structures for measuring pressure. For instance, the capacitor 654 can be used in place of the capacitor 872, or the capacitor 654 can be employed in a separate resonant circuit with an inductor whose capacitance does not vary with temperature in order to provide a response pulse that is indicative of an ambient pressure within the first interior region 828. Likewise, any of the aforementioned pressure transmission apparatuses 385, 485, 585, and 785, by way of example, may be incorporated into any of the detection apparatuses 804, 904, and 1004 for the purpose of detecting an ambient pressure within the first interior region 828. Again, such pressure transmission apparatuses 385, 485, 585, and 785 could be provided, for instance, as separate devices additional to the electrical circuit apparatus 864, 964, and 1064, and which generate a separate response pulse responsive to the excitation pulse. These can be incorporated in any of a variety of fashions, such as by providing characteristic frequencies for each such pressure transmission apparatus, by way of example, or by providing separate excitation pulses that separately excite the pressure transmission apparatuses. Other examples will be apparent.

It thus can be seen that the advantageous use of the core 884 with a magnetic permeability that varies in a known fashion with temperature in order to detect a temperature within the interior of a vessel of a DCSS is highly advantageous. Furthermore, the incorporation of capacitor 654 or any of the pressure transmission apparatuses 385, 485, 585, and 785 advantageously enables the detection of an ambient pressure within the interior of a vessel of a DCSS is likewise highly advantageous. Other advantages will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A dry cask storage system (DCSS) structured to contain therein an amount of spent nuclear fuel (SNF), the DCSS comprising:
   a vessel having a wall that is formed of a metallic material and that is formed to have a first interior region, the first interior region being structured to receive therein the SNF;
   a overpack that is formed of a cementitious material and that is formed to have a second interior region, the vessel being received in the second interior region;
   a detection apparatus that is cooperable with an electronic processing apparatus, wherein the electronic processing apparatus is situated outside of the DCSS, the detection apparatus comprising a transmitter, an electrical circuit apparatus, and a receiver;
   the transmitter being positioned inside the second interior region and outside the vessel and being structured to generate an excitation pulse and to transmit the excitation pulse through the wall and into the first interior region;
   the electrical circuit apparatus having a resonant electrical circuit that is situated within the first interior region and that is structured to generate a response pulse in response to the excitation pulse and to transmit the response pulse in the form of a magnetic field signal that is structured to travel from the first interior region and through the wall;
   the resonant electrical circuit comprising a plurality of circuit components, at least one circuit component of the plurality of circuit components having a property which is structured to vary in response to a condition within the first interior region and which, responsive to a change in the condition, is structured to cause the property and the response pulse to vary with the change in the condition and to be indicative of the condition; and
   the receiver being situated inside the second interior region and outside the vessel, the receiver being structured to receive the response pulse and to communicate to the electronic processing apparatus an output responsive to the response pulse.

2. The DCSS of claim 1 wherein the at least one circuit component of the plurality of circuit components comprise an inductor having an inductance which is structured to vary in response to the condition and which, responsive to the change in the condition, is structured to cause the response pulse to have a frequency that varies with the condition.

3. The DCSS of claim 2 wherein the first interior region has temperature, the inductor having a core that has a permeability that is structured to vary in response to the temperature and which, responsive to a change in the temperature, is structured to undergo a change in its permeability to alter the inductance and to resultantly cause the response pulse to have a frequency that varies with the temperature.

4. The DCSS of claim 1 wherein the receiver is structured to receive the excitation pulse from the transmitter prior to receiving the response pulse from the electrical circuit apparatus, and wherein the detection apparatus further comprises a gating circuit that is structured to attenuate from the output a portion of the output that is responsive to the excitation pulse.

5. The DCSS of claim 4 wherein the gating circuit is switchable between an OFF condition wherein it attenuates from the output the portion of the output that is responsive to the excitation pulse and an ON condition a predetermined period of time after the generation of the excitation pulse wherein the gating circuit ceases attenuation of the output.

6. The DCSS of claim 1 wherein:
the detection apparatus further comprises another transmitter, another electrical circuit apparatus, and another receiver;
the another transmitter being positioned inside the second interior region and outside the vessel and being structured to generate another excitation pulse subsequent to the generation of the excitation pulse and to transmit the another excitation pulse through the wall and into the first interior region;
the another electrical circuit apparatus having another resonant electrical circuit that is situated within the first interior region and that is structured to generate another response pulse in response to the another excitation pulse and to transmit the another response pulse in the form of another magnetic field signal that is structured to travel from the first interior region and through the wall; and
the another receiver situated inside the second interior region and outside the vessel, the another receiver being structured to receive the another response pulse and to communicate to the electronic processing apparatus another output responsive to the response pulse.

7. The DCSS of claim 1 wherein:
the detection apparatus further comprises another electrical circuit apparatus;
the another electrical circuit apparatus having another resonant electrical circuit that is situated within the first interior region and that is structured to generate another response pulse in response to the excitation pulse and to transmit the another response pulse in the form of another magnetic field signal that is structured to travel from the first interior region and through the wall; and
the receiver being structured to receive both the response pulse and the another response pulse and to communicate to the electronic processing apparatus as the output an output signal that is responsive to the response pulse and the another response pulse.

8. The DCSS of claim 7 wherein the transmitter includes a transmitter antenna, and wherein the receiver includes a receiver antenna, at least one of the transmitter antenna and the receiver antenna comprising a number of windings that are of an annular configuration that extend about a portion of the vessel.

9. The DCSS of claim 7 wherein the transmitter includes a transmitter antenna, and wherein the receiver includes a receiver antenna, the transmitter antenna comprising a number of first windings that are of an annular configuration, and the receiver antenna comprising a number of second windings that are of an annular configuration.

10. The DCSS of claim 9 wherein the number of first windings and the number of second windings circumscribe a portion of the vessel.

11. The DCSS of claim 9 wherein the resonant electrical circuit and the another resonant electrical circuit are both situated one of within and adjacent the portion of the vessel circumscribed by the number of first windings and the number of second windings.

12. The DCSS of claim 9 wherein the number of first windings circumscribe a first portion of the vessel, and wherein the number of second windings circumscribe a second portion of the vessel, the resonant electrical circuit and the another resonant electrical circuit being situated within at least one of the first portion of the vessel and the second portion of the vessel.

13. The DCSS of claim 1 wherein the detection apparatus comprises a pressure transmission apparatus that is structured to output as the response pulse a pulse that is indicative of an ambient pressure within the first interior region.

14. The DCSS of claim 1 wherein the plurality of circuit components comprise a capacitor whose capacitance varies with ambient pressure within the first interior region, and wherein the resonant electrical circuit is structured to output as the response pulse a pulse that is indicative of an ambient pressure within the first interior region.

* * * * *